United States Patent
Pulfer

(10) Patent No.: US 7,295,957 B2
(45) Date of Patent: Nov. 13, 2007

(54) DYNAMIC PROCESS MANAGEMENT FOR THE RECORDING, MODELING, DOCUMENTATION AND VALIDATION OF COMPLEX PROCESSES AND SYSTEMS

(76) Inventor: Roland Pulfer, Lätti 328a, 3053 Münchenbuchsee (CH)

( * ) Notice: Subject to any disclaimer, the term of this patent is extended or adjusted under 35 U.S.C. 154(b) by 494 days.

(21) Appl. No.: 10/490,621

(22) PCT Filed: Sep. 20, 2002

(86) PCT No.: PCT/CH02/00516

§ 371 (c)(1),
(2), (4) Date: Mar. 25, 2004

(87) PCT Pub. No.: WO03/027916

PCT Pub. Date: Apr. 3, 2003

(65) Prior Publication Data
US 2004/0233056 A1    Nov. 25, 2004

(30) Foreign Application Priority Data
Sep. 25, 2001 (CH) .................................... 1768/01

(51) Int. Cl.
*G06F 17/50* (2006.01)
*G06Q 99/00* (2006.01)
(52) U.S. Cl. ............................................. 703/6; 705/1
(58) Field of Classification Search .................... 703/1, 703/6; 705/1, 7; 715/500
See application file for complete search history.

(56) References Cited

U.S. PATENT DOCUMENTS

| 4,849,879 A | 7/1989 | Chinnaswamy et al. ...... 706/45 |
| 5,521,814 A | 5/1996 | Teran et al. ................. 700/266 |
| 5,832,532 A | 11/1998 | Kennedy et al. ............. 715/503 |
| 5,890,133 A | 3/1999 | Ernst ............................. 705/7 |
| 6,278,977 B1 | 8/2001 | Agrawal et al. ............... 705/7 |

FOREIGN PATENT DOCUMENTS

| EP | 1 065 617 | 1/2001 |
| WO | WO 97/48063 | 12/1997 |

OTHER PUBLICATIONS

Georgakopoulos D. et al.: *An Overview of Workflow Management: From Process Modeling to Workflow Automation Infrastructure*, Distributed and Parallel Databases, Kluwer, NL, vol. 3, No. 2, Apr. 1995, pp. 119-153.

*Primary Examiner*—Paul Rodriguez
*Assistant Examiner*—Eunhee Kim
(74) *Attorney, Agent, or Firm*—Kenyon & Kenyon LLP

(57) ABSTRACT

The invention concerns a method for modeling, documenting and validating a system, preferably a company, comprising the following steps: Providing one or more sensors in a system, defining data to be recorded, parameterizing the data to be recorded, transforming the parameterized data to objects with parameters, linking the parameters of the objects by standardized relationships, checking and, if required, completing or modifying the recorded objects and their parameters, recording the parameterized data by means of the sensors, standardized analysis of the relationships of the objects, outputting the results of the standardized analysis in printed or in electronic form. Said steps are repeated at time intervals.

7 Claims, 28 Drawing Sheets

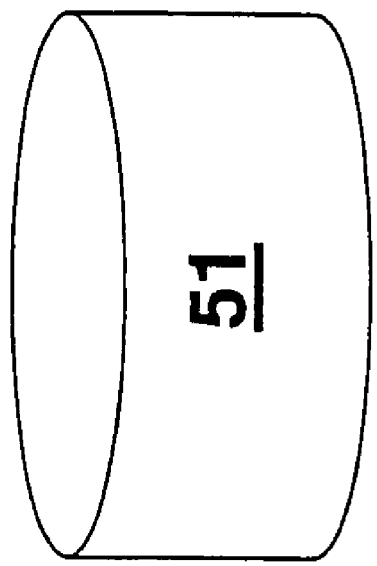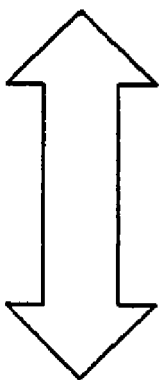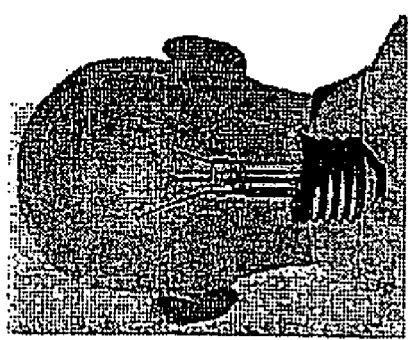
Fig. 5

Fig. 28
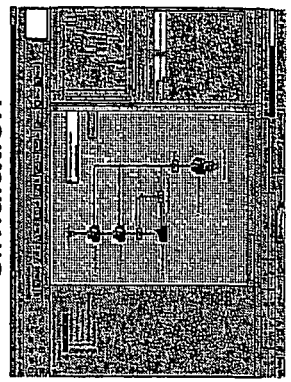
Workflow management, simulation
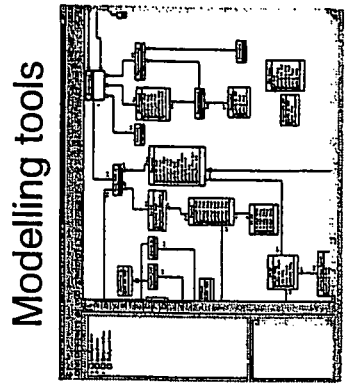
Modelling tools
Software product / platform
- Professional edition
- Team edition
- Enterprise edition
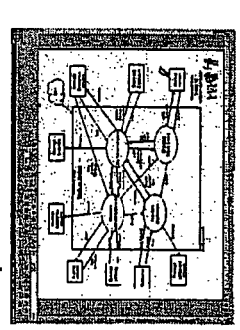
Graphical interface
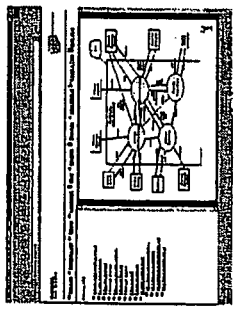
Web interface
281
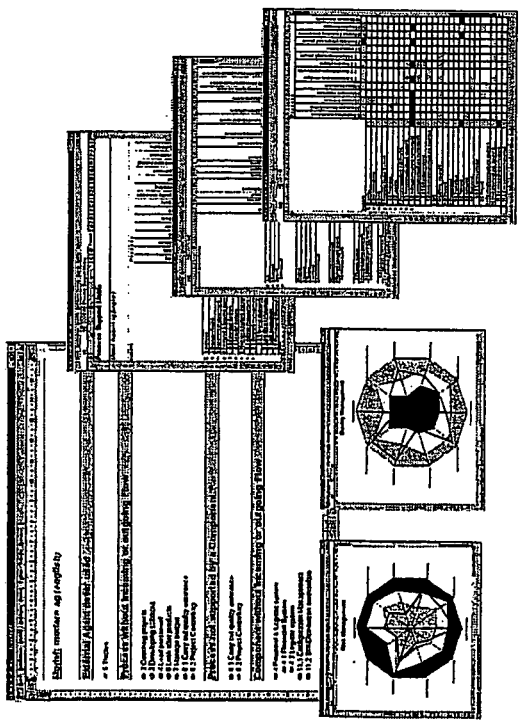
Quality management, risk management reports

DYNAMIC PROCESS MANAGEMENT FOR THE RECORDING, MODELING, DOCUMENTATION AND VALIDATION OF COMPLEX PROCESSES AND SYSTEMS

This application is a 371 national phase application of PCT/CH02/00516 filed on 20 Sep. 2002, claiming priority to ch 1768/01, filed on 25 Sep. 2001, the contents of which are incorporated herein by reference in their entirety.

The invention lies in the field of process management, in particular the dynamic process management by means of computer programs and sensors for the recording, modeling, documentation and validation of complex processes and systems according to the preamble of the independent claim.

BACKGROUND OF THE INVENTION

In complex situations, processes and systems that comprise a multitude of interrelated parameters, it is very difficult to predict the influence of changes to single parameters on the behavior of the total system. For example, when leading an enterprise, or when organizing large projects, taking decisions is a problem. Since the number of control parameters increases with the size of an enterprise or a project, the control variables often cannot be viewed as a whole. Therefore, it is very difficult to distinguish relevant factors from irrelevant ones, to weigh them and to analyze them in context. For the above reasons, decisions on a management level are nowadays often taken arbitrarily. A further problem lies in the fact that influencing parameters cannot be recorded objectively. Due to changing circumstances and given facts, and due to lack of standardization, influences are appraised and interpreted differently. This constitutes a further problem in decision taking, which requires a solution.

A standardized recording of relevant influencing parameters, their qualification and analysis is nowadays practically impossible, or involves a very large amount of time and use of resources. A dynamic recording and analysis of a multitude of measurements fails due to the abovementioned problems, the complexity, the quality and consistency of the relevant information.

SUMMARY OF THE INVENTION

It is the object of the invention to show a method that permits a standardized recording, analysis, checking and representation of complex systems and processes.

The implementation of the invention preferably is done in the form of one or more computer programs and by means of associated, respectively functionally related sensors. The inventive method can be used for the control of all aspects in a complex system, in particular an enterprise. The goal consists in recording and representing the processes and actions in the system considered and in placing them in relation to one another. By the use of standardized processes and algorithms in the creation of models and their verification, for example by comparison with alternative models, a dynamic image is generated, which represents the processes in terms of their relevant parameters. By a formulation by means of a meta-model, abstract processes can be represented in a simplified manner. By the construction as a framework, the scalability is ensured as well.

In order to assist the appreciation of the invention, a cockpit/aircraft simulator shall serve as a practical example. In a simplified view, the invention is based on the same principles as the instrumentation of a cockpit/aircraft simulator. The pilot can control and supervise everything, but is not provided with unnecessary information that he does not need. The pilot nevertheless has access to all information to every degree of detail, if he needs it. Thus, under normal circumstances, the pilot can safely steer the aircraft with a small amount of relevant information, instruments and manual controls. He can, in the plane simulator, go through strategies, work out variations, test behavior and perform simulations and verify possible effects of them.

According to a simplified view, the invention comprises essentially three parts. These parts can be applied individually or as a complete package. The first part is a scaleable software package that is configured individually according to the wishes of the operator of a complex system. A second part is a model for proceeding that is pragmatic and oriented according to practice and is a further development of a known model for proceeding called "OOW" (Object Oriented Way), which is described in the book "Der objektorientierte Weg" (ISBN 3-9521597-0-0) by the authors Roland Pulfer and Urs Schmid. A third part comprises a normalized procedure which helps a user to reach standardized results at a fixed date and with a defined effort.

The invention can comprise a so-called electronic adviser. This electronic adviser, in simple terms, is an automated version of a classical adviser. This electronic adviser knows about reference models, can accept information and propose alternative solution scenarios. The electronic adviser helps, on the one hand, to show the interrelations in a complex system and to make them transparent, on the other hand he helps to filter out information that is not required at the moment. Preferably, all affected and participating sensors, control variables and control locations should be quickly reachable, such that the process or processes can be influenced and optimized. This should support the information flow in an optimal manner. The affected and participating sensors, control variables and control locations may not be flooded with irrelevant information. In the following, the significance of an electronic adviser is explained in terms of an enterprise. In the case of an enterprise, the electronic adviser should, whenever possible, support a conditional exchange and comparison (bench-marking) between enterprises on a neutral platform. Since many enterprises that are busy with largely different goods and services comprise similar internal structures and process sequences, a comparison between a process model from one enterprise with a process model of another enterprise does indeed make sense. By means of a standardized approach, the models can be interchanged, or traded, respectively. The motivation in offering such a electronic and personal assistant and adviser follows, for example, from the fusion of internal and external advisors. Many companies have employees that have worked as advisors for many years and have a huge knowledge. This results in making external advisors increasingly unnecessary. A disadvantage of external advisors lies in that it takes them far too long to work out well-founded know-how about important internal processes.

The invention wants, on the one hand, to support the innovation, the engineering, the project management and the implementation of goals, and, on the other hand, help to control the activities of an enterprise. The cockpit/flight simulator for the entrepreneur is a good representation of the inventive idea. A complex system such as e.g. an enterprise must be viewed and led as a whole and it should be possible to perform checks already on a model basis. In order not to have the complexity of the problems hinder the manager of an enterprise in his work, certain information, in analogy to a cockpit/flight simulator with a pilot sitting in it, must be only around at a certain time and in a certain level of detail. During normal operation the pilot must only observe and operate a few important instruments and visualizations. When an irregularity occurs, he must be able to reach ("drill down" procedures) any detail information, in order to support his actions. He is presented with scenarios, alternatives are computed and their effects are shown.

The invention is more closely explained on the basis of the subsequent figures. They show schematically and strongly simplified:

BRIEF DESCRIPTION OF THE DRAWINGS

FIG. 5 connection with a knowledge database;
FIG. 28 reports that can be created, and corresponding software.

DETAILED DESCRIPTION OF PREFERRED EMBODIMENTS

Figure 1:
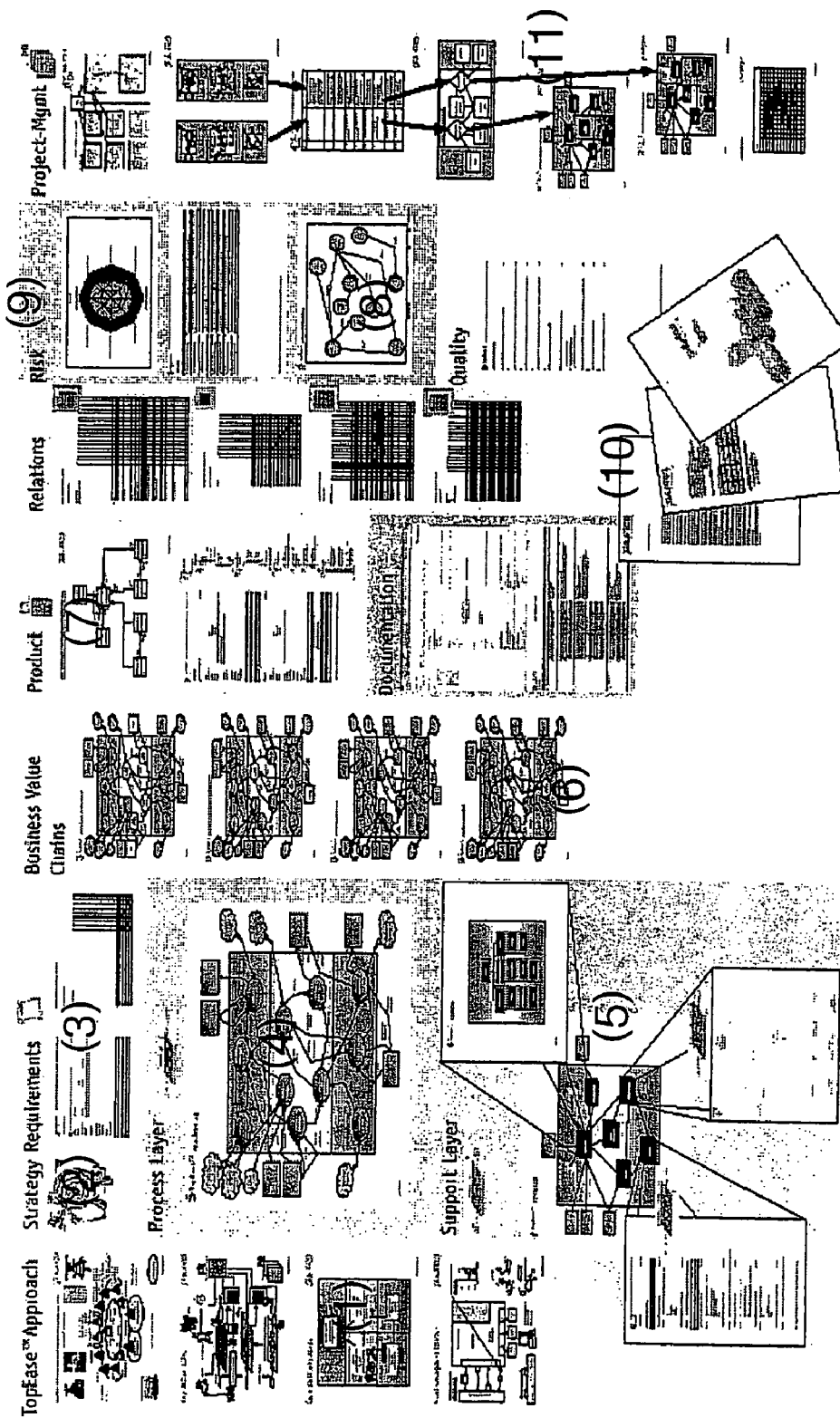
FIG. 1 process sequences in a complex system.

FIG. 1 schematically shows processes as they may arise in a complex system, e.g. an enterprise. The already mentioned comparison to a cockpit/flight simulator is visualized in FIG. 1 in another manner. This overview only shows a few of the most important foundations of the framework that may be extended arbitrarily.

For a target audience 1, strategies 2, requirements 3, processes 4, process support 5 (infrastructure, software, organization, standard products) business value chains 6, products 7, their cross-linking and dependencies 8 are recorded, modeled, documented and validated. Further, if necessary, a risk management 9 and quality management 10 are supported.

The models already mentioned are static views and refer to a particular point in time (slot). For this point in time, all goals, definitions, descriptions, rules, exceptions, states and behavior are described. The change over time is determined by means of the change between two points in time (slots). By comparing and merging by means of Compare & Merge algorithms, a project portfolio (need for action) is determined. A list of all changes can subsequently be used for the definition of projects 12. These activities all are accompanied by the approach by means of result lists, methods and techniques, check lists etc.

Figure 2:
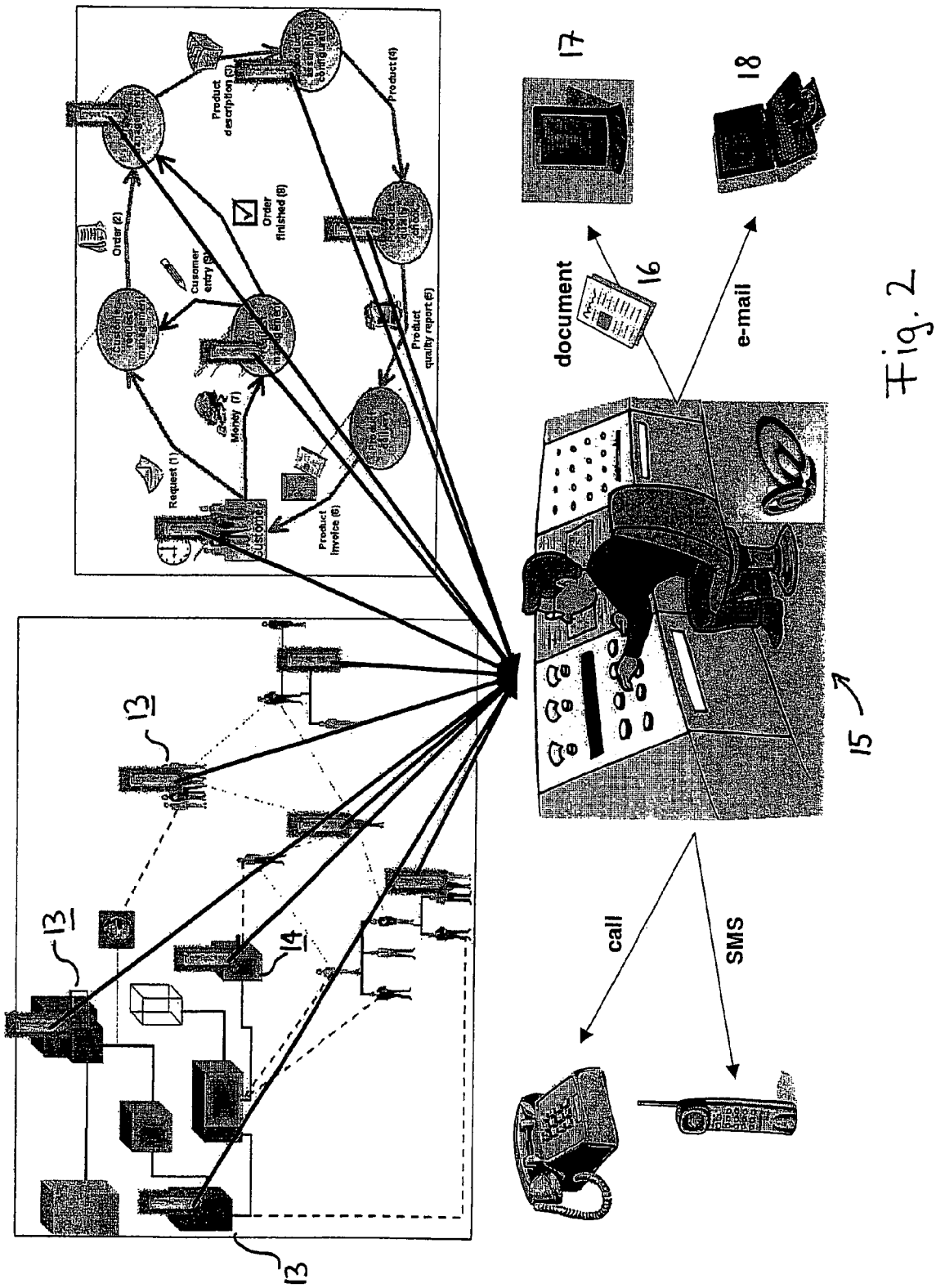
FIG. 2 a supervision of processes with parameters according to FIG. 1.

FIG. 2 schematically shows a supervision of processes and parameters according to FIG. 1. In order to create a sustainable benefit of an engineering according to FIG. 1 in an enterprise, sensors 13 or adapters 14 are installed at defined locations in an enterprise. These sensors 13 can operate manually or electronically. The sensors 13 serve to sample relevant information actively or passively and to report it to the process supervision 15. For this purpose, threshold values or limit values are defined.

With the collected information, based on the configuration of the process supervision, actions can be initiated. The distribution of information can be accomplished in a conventional manner e.g. by means of paper 16 or in another manner, e.g. electronically or by using existing networks (e.g. cell phone network). Depending on settings and limit values an action is initiated, e.g. an SMS, a sending of documents by e-mail, a transfer of information to a mobile device, e.g. palmtop 17 or portable computer 18, or a voice message is transmitted by phone. Of course it must be possible to act and react, from the outside, according to the situation. For example, it must be possible to change threshold values, parameters and configurations. These changes can be realized manually or electronically (e.g. through a mobile device). If required, it therefore is possible, largely independent on location, to acquire and request all important information and to react accordingly.

Figure 3:
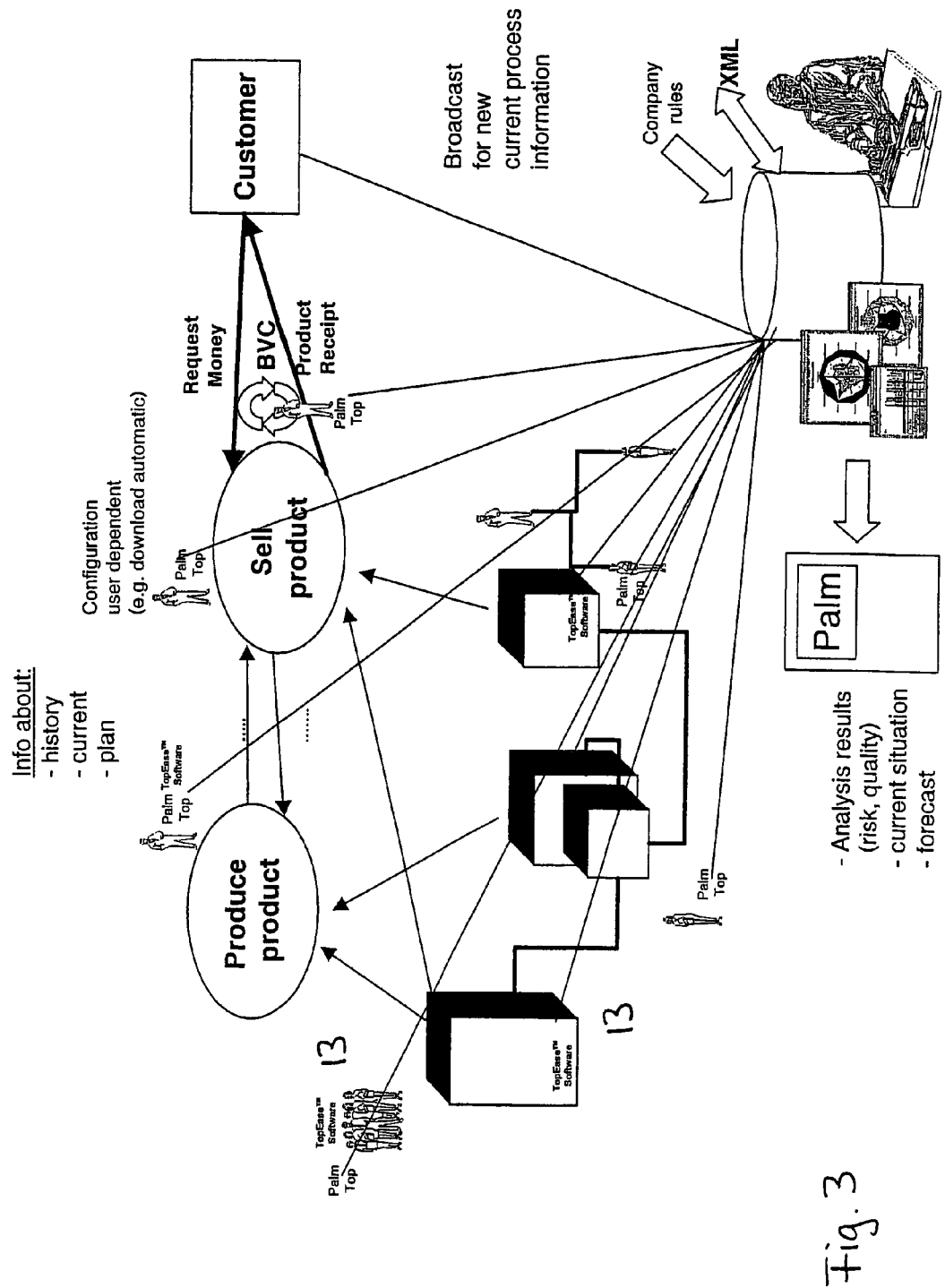
FIG. 3 an overview over sensors and their arrangement.

FIG. 3 schematically shows an overview over sensors and their arrangement in a complex system.

Sensors 13 are preferably inserted in the form of software products into a business. Other kinds of sensors (e.g. embedded systems) are possible. The invention in addition allows to realize a passive and active database query or store procedure. Furthermore, if the need occurs, the possibility exists to analyze online movements on shares or folders, in order to, for example, incorporate current data that are made available through flat-file. Thus, for the first time the possibility exists to automatically supervise and control changes of model information or performance figures. Based on these current performance figures and model information, information from the running operation can bring massive facilitation for the modeling of further target states. This necessitates, however, that after the engineering a business model for supervision and control of the running operation is generated from the engineering content.

Figure 4:
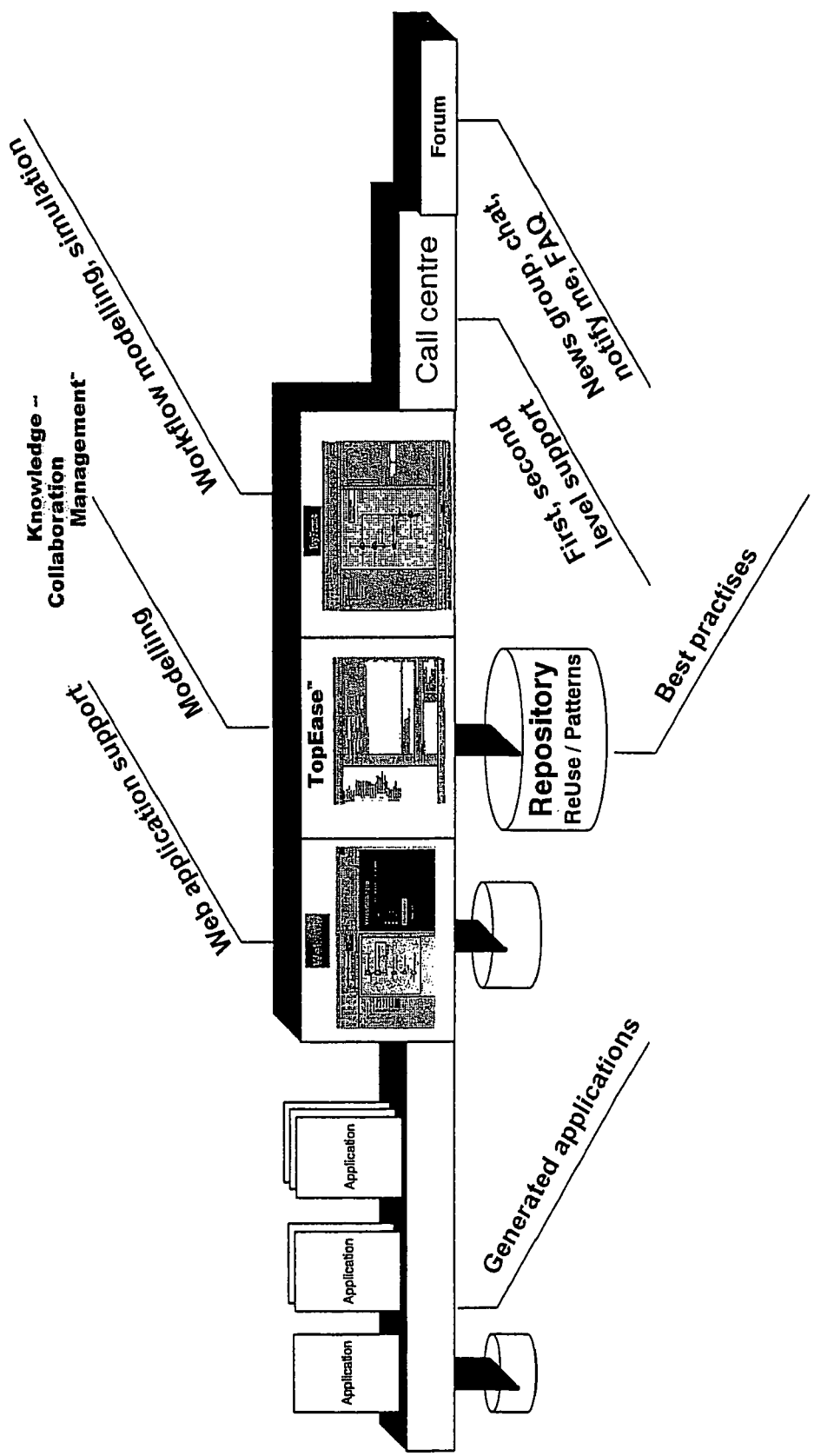
FIG. 4 a server based application.

FIG. 4 schematically shows the use of a server. An aspect of the invention consists in making available all relevant fundamentals through a server, for example over the internet. The entire software is installed on this server. In this way, installing the software in the enterprise itself can be avoided. Furthermore, with a server based application it is possible to directly generate applications and workflows. These generated applications can also be made available for the business directly on this platform. If someone does not wish to run applications or models on this platform, he can download them after their generation. A server based installation (ASP) should, when required, also be used for comparison with others (benchmarking). This is done by the offering of comparison models that are deposited in a data base (repository). As further steps, customers or guests shall be able to offer their optimal solution ("best practice") for sale to others, or may download such patterns from others. As the last functionality defined till today, models shall be loadable on the platform for only the purpose of quality assurance. With the ASP version, a further step is taken in the direction of an electronical engineer/advisor. Over such a platform that can simultaneously offer a telephone advice center (call center) and/or a forum (chat, FAQ, news group), without further effort, manually, human generated results for completing the available information can be made available. With this functionality, the first version of an electronic or anonymous engineer/consultant is made available.

FIG. 5 shows a connection with a knowledge database 51. The invention allows to be connected with a knowledge management system. This connection allows the navigation and the access to information for a larger target audience. With simple search terms, it information should be able to be queried and modeled. Just the continuous process improvement and the quality of documentation should be increased by this functionality.

Figure 6:
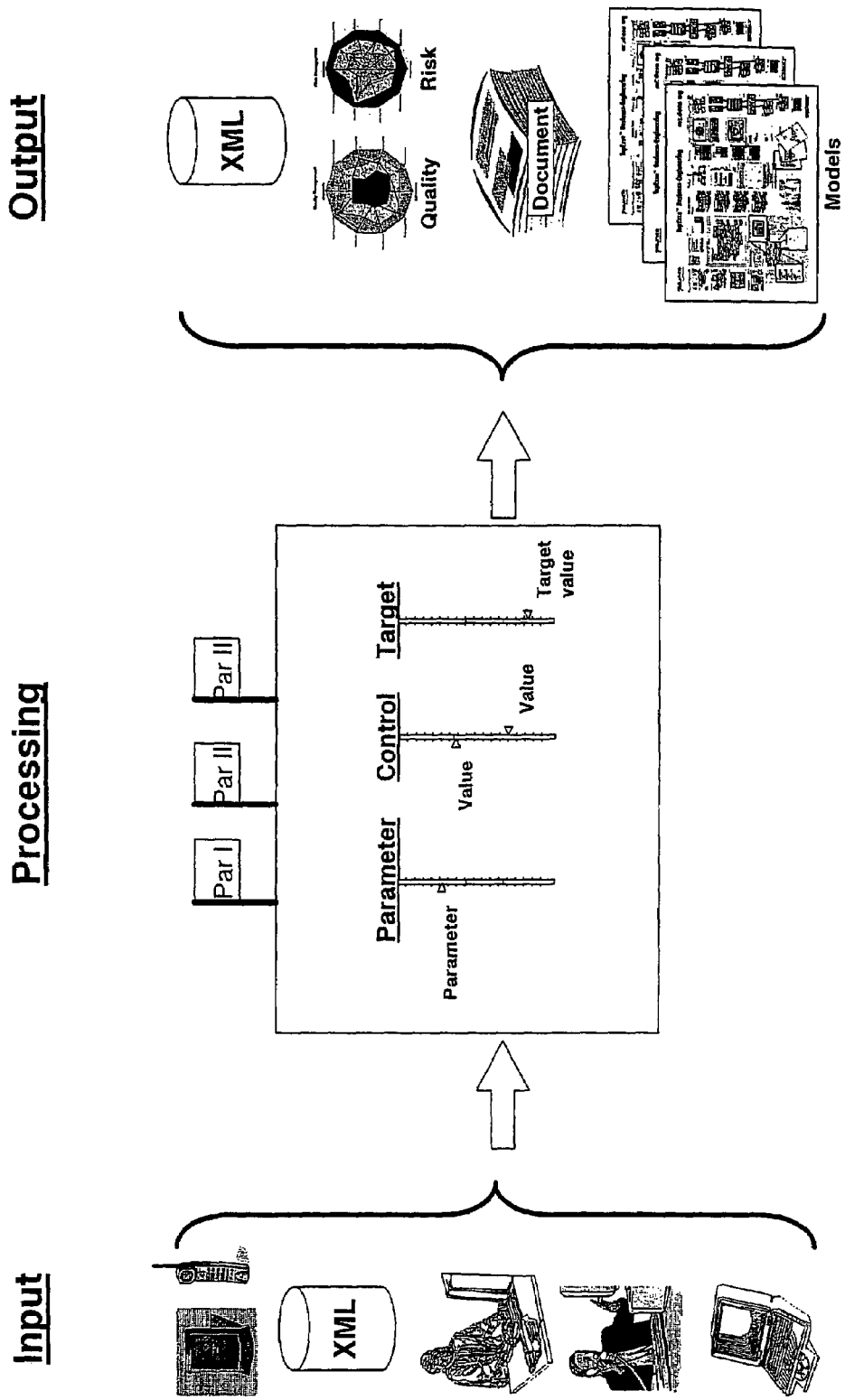
FIG. 6 processing of information.

FIG. 6 shows, in a simplified representation, the processing of information. The processing of information as a rule is done according to an input-based meta-model which, by means of mathematical functions and based on pre-adjusted or configured parameters, makes available as output models, files, data, graphic representations and documents. In the left half of the image, the input data are shown. They are based on sensors or on other sources. As other sources, portable devices (mobile phones), databases, persons etc. come into question. On the right hand side, the output variables are shown schematically. They are intermediate results, results, information for databases, reports and flow diagrams.

Figure 7:
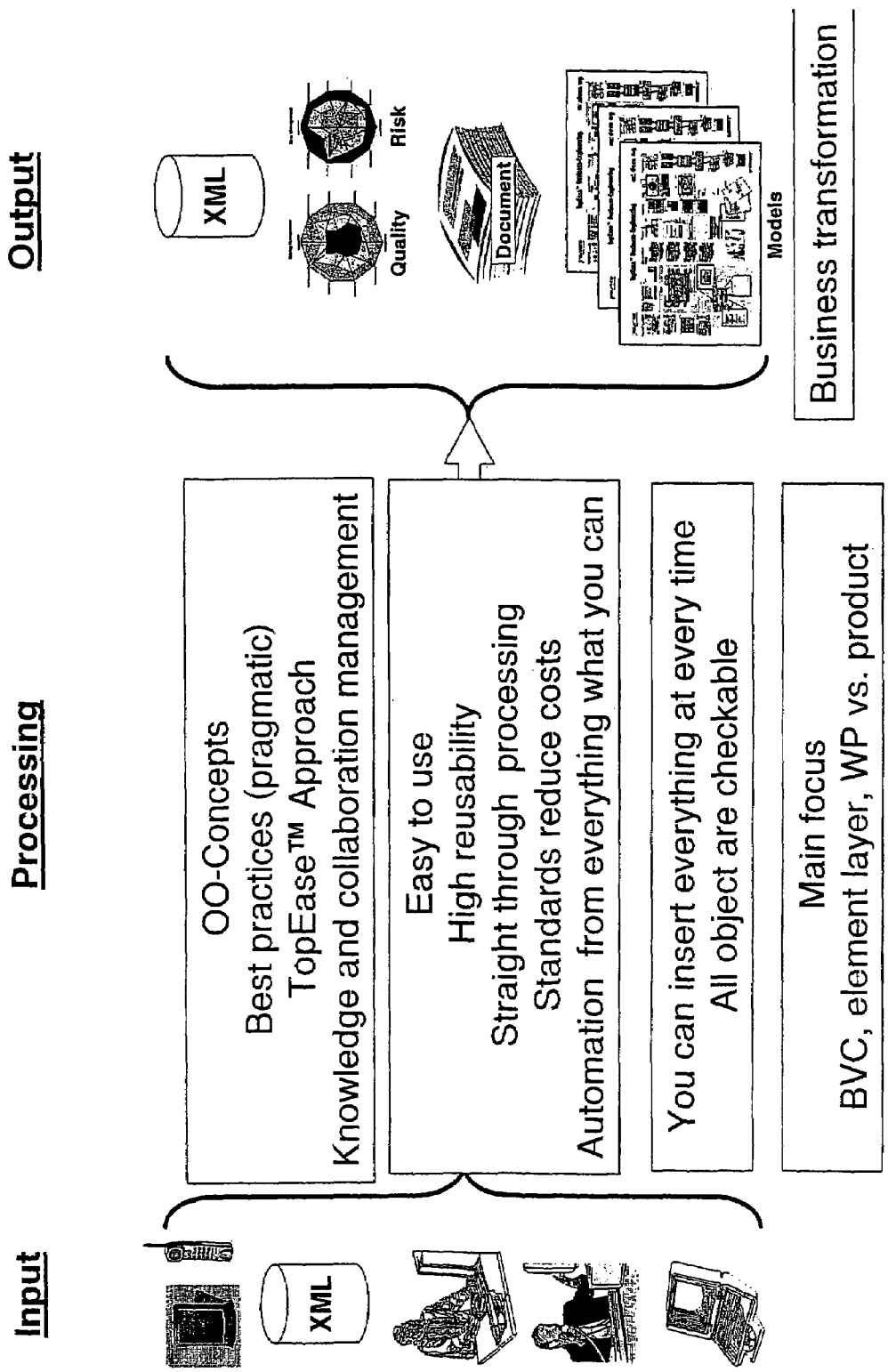
FIG. 7 a possible basic structure.

FIG. 7 schematically shows the basic structure of the method. The basic structure preferably is based on object oriented concepts. Therefore, the implementation happens by means of a suitable programming language such as e.g. Java. The consequently applied concepts of object orientation in the defined results (e.g. process, business value chain, product et.) are essential. Next to object oriented concepts (e.g. encapsulation, inheritance, object, class, etc.), also the orientation towards practice (e.g. reduction of complexity), the re-use, pragmatism (transparency, consistency) and cross linking are to be mentioned.

The basis excels especially in that with the inventive tool not only models can be modeled and documented, but also that all models can be validated. Depending on their degree of completeness, models may be provided with operative information (online) or compared (ASP, benchmarking).

Figure 8:
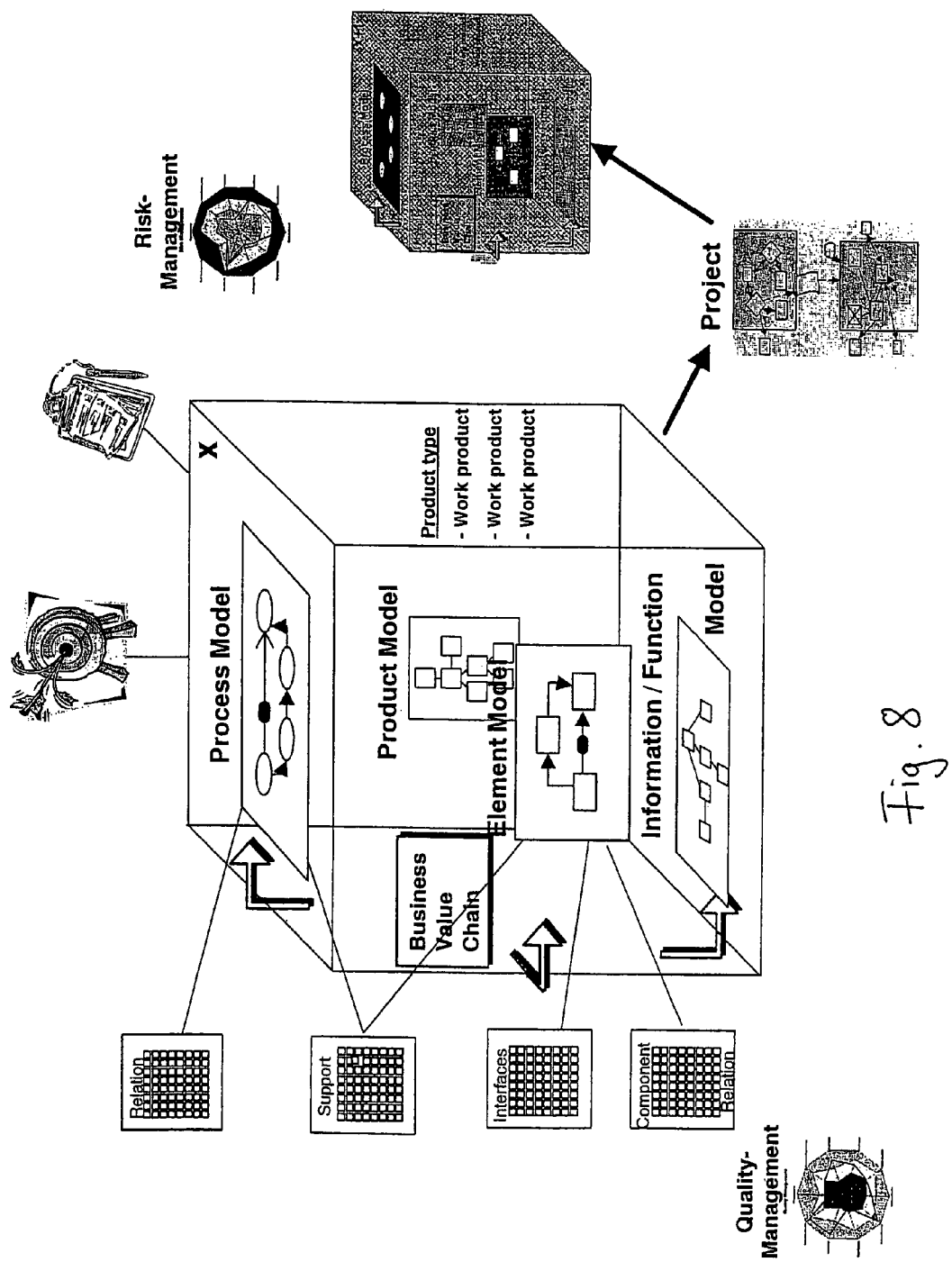
FIG. 8 key results in a cube representation.

FIG. 8 schematically shows, by means of cubes 81, 82, key results at different points in time. These key results and their cross-linking can be extended as the need arises. At the core, six key results are contained, which are linked with the remaining results. The key results are represented on the sides of a cube. The schematic cube representation shows how these key results hang together. All models can be created (modeled) and documented individually. The essential advantage, however, lies in that two models joined by an edge can be validated by a third model, which is also joined by one edge each to the two other models. Consequently, an analysis of edges (relations) and also nodes (objects) can be made. Thus any kind of information can be modeled, documented and validated.

On the large cube 80, as also on the small cube 81, six models are to be seen. Process 82, element 82, information, function 84, business value chains 85, Product 86 and 87. Around this cube, results such as quality assurance 88 and risk management 89 are represented, which are generated or derived by or from one or more of the other results (matrices, quality graphs and risk graphs). But there are also results that influence all other results (strategy 810, requirements 811) or have a simple relation. Along these relations an analysis of effects shall later be made.

The large cube 80 represents a complex system, e.g. a company, at a given instant in time (Slot), and the small cube 81 the same company at another point in time. Between these two cubes 80, 81 a need for action arises which can be assigned to concrete projects by means of a project portfolio. The need for action can, for example, be generated in different ways by a merge & compare algorithm (optimal synergy, few interfaces, minimal change).

Regarding interrelations, the work product 87 plays an elementary role. A work product is an object characterized as an information and function container between two or more processes, elements, business value chains etc. This means that objects are moved to and fro (interface object). A work product can be generated anywhere and can also end again. A work product can also have a defined relation to a product.

Figure 9:
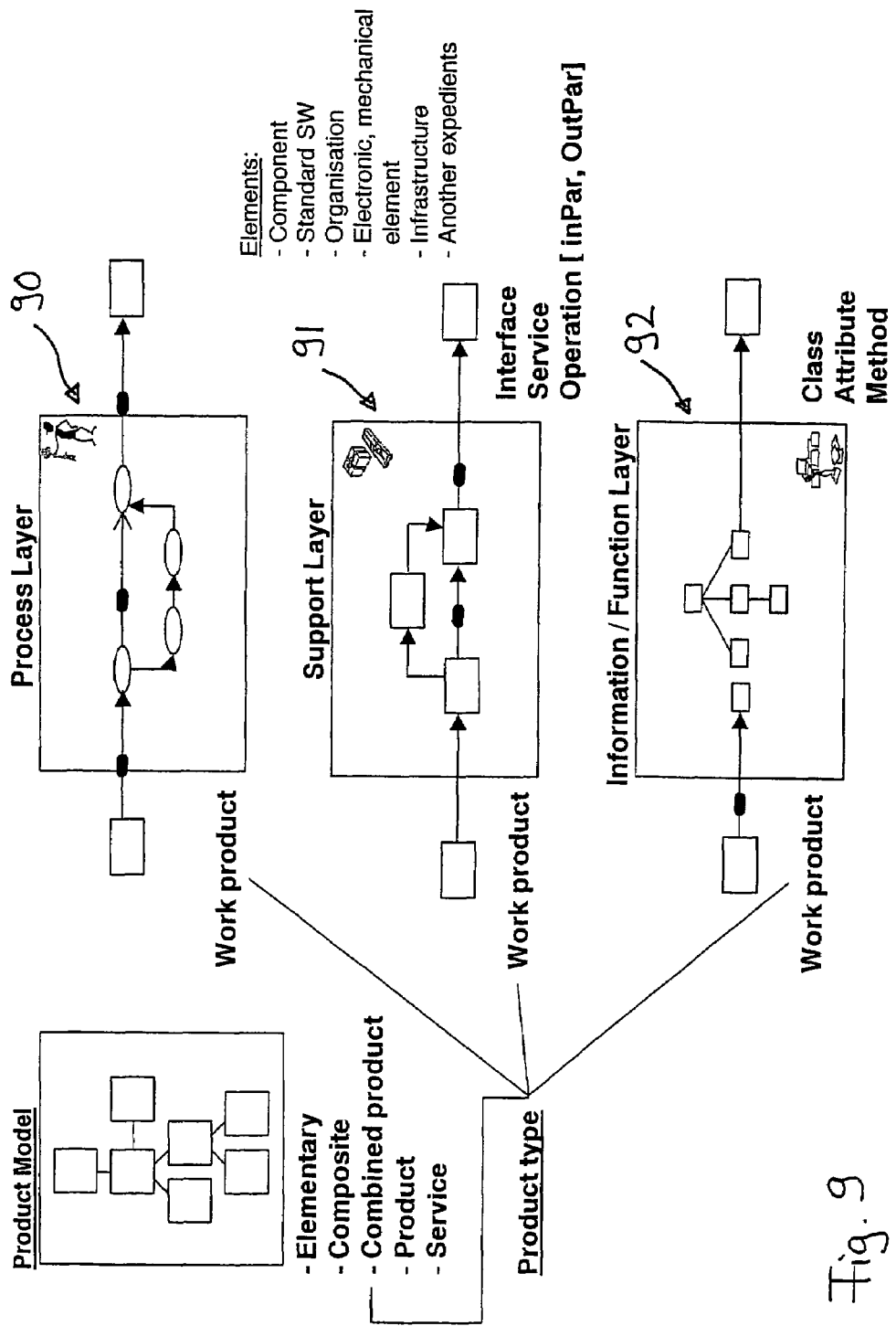
FIG. 9 work products on different meta layers.

FIG. 9 schematically shows work products on three different meta layers 90. 91, 92. The work product is one of the essential results of the inventive concept. On this result and its dependencies and principles on the one hand the process engineering and on the other hand a part of the quality management are based. As a further point the comprehensive risk management is to be mentioned, which is based on the interplay of nodes (objects) and edges (relations). Between a work product and a product, and between work products among each other, uniquely expressible relations exist. These relations can also have an effect over several different layers. These dependencies can be types, aggregates, compositions, or simple relations. By this view of results that are used or generated in a company, and are modeled in an engineering step as work product, a net is produced. As already mentioned, with the aid of particular objects and the net, unequivocal statements (e.g. quality, effect) can be made. These objects also carry, for the engineering and later for a workflow simulation, essential information such as quantities, relative frequency, the manner of transport (manual, electronically) or e.g. temporal behavior.

Figure 10:
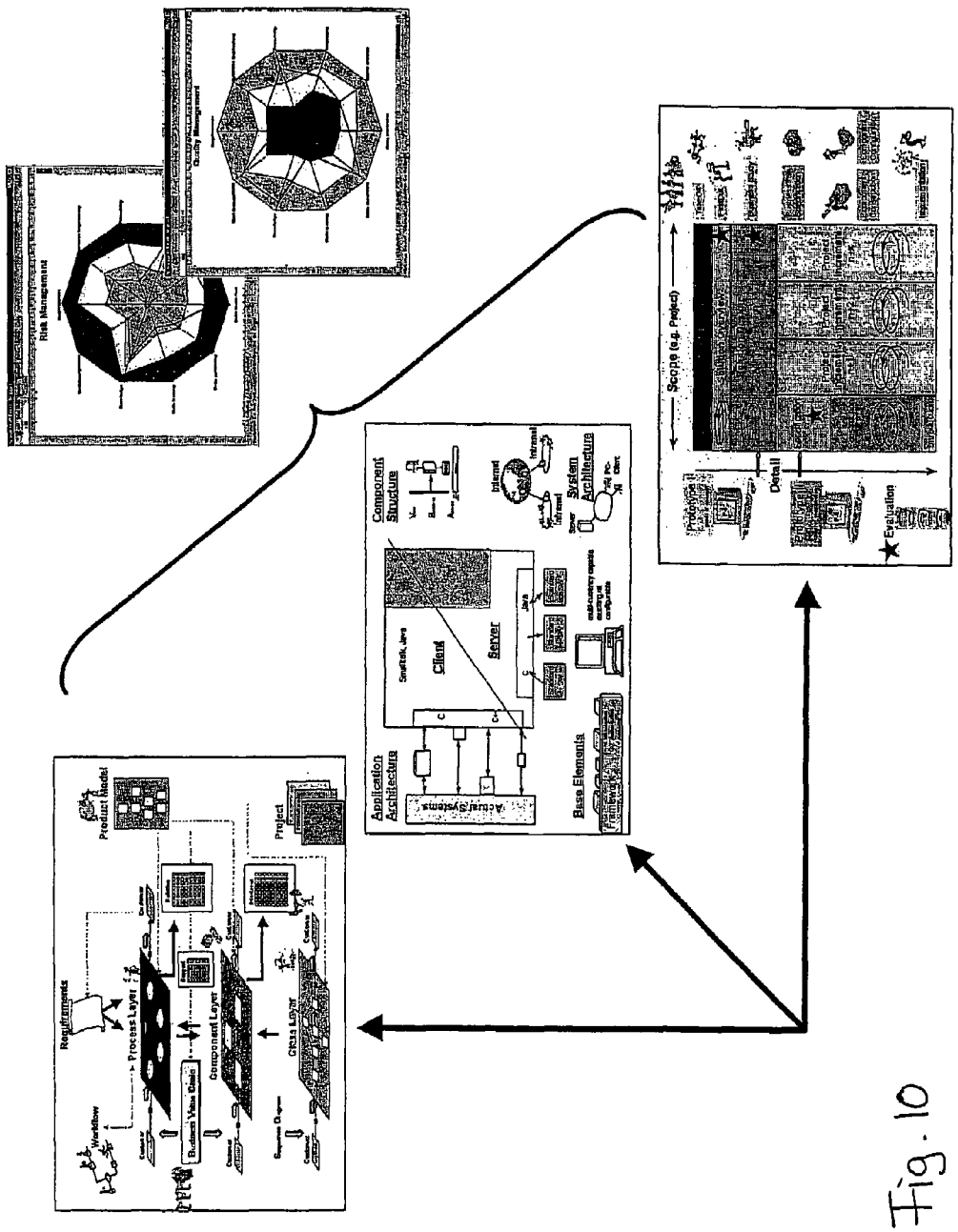
FIG. 10 the dimensions used, in a simplified representation.

FIG. 10 simplifies the dimensions used. The approach shown is partially based on the book "Der Objekt-Orientierte Weg" (OOW) by the applicant (ISBN 3-9521597-0-0), mentioned above. In order to allow results to be defined and positioned uniquely, for the sake of clarity a dimension is omitted in the depiction of relationships. This was done by combining the dimension methods/techniques with the dimension results/activities. Since methods and techniques mainly are related to results and activities, the expressiveness is maintained to a large extent. The fourth dimension, plans was put on the second dimension as a replacement of methods/techniques. The plan always is related to results and activities. Actually, in this dimension, only templates are concerned. In these templates it is recorded which result sequences with what degree of detail lead to which total result and which activities are used therefore. In this approach it is also defined according to and with which methods and techniques these results are worked out. The third dimension, architecture, remains unchanged. By this change the overall information is maintained, but the complexity is significantly reduced and the viewing and use is simplified.

Figure 11:
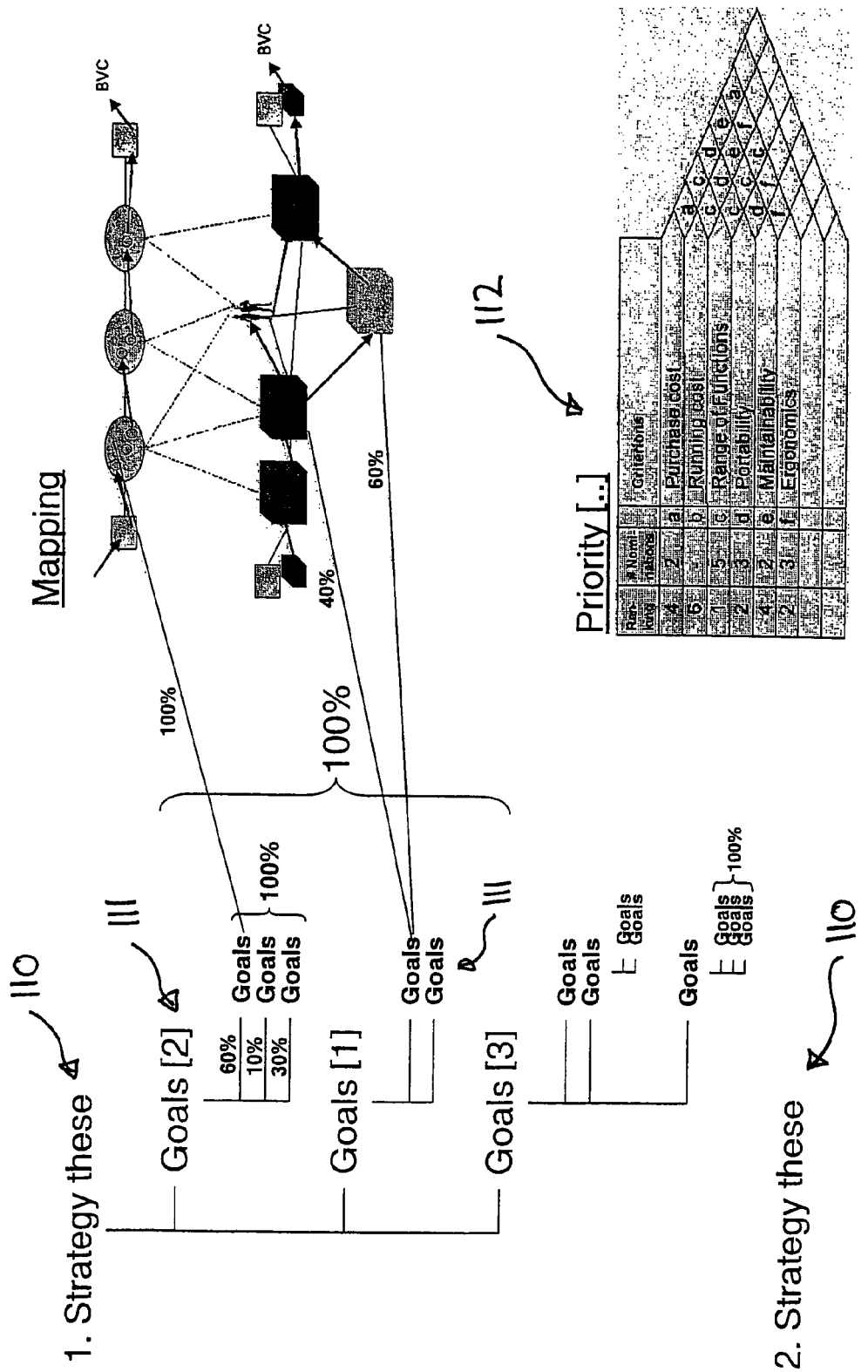
FIG. 11 a separation of strategies and goals.

FIG. 11 schematically shows a representation of strategy and goal separation. One of the big advantages of the inventive concept consists in that objects are placed into a relation to one another by means of simple rules. This principle is adopted from nature, where almost every element has a relationship to another one and can influence or be influenced through the relationship. If one properly views and defines these mutual relationships, interesting aspects can be derived from the results. First, by means of this interconnection, something can be stated about quality, and on the other hand a complete analysis of effects can be made. In order to have these statements actually be of use, they must be made very simple and defined uniquely. It must be defined what the individual relationships signify, how they are constructed and what effect they may have on others. If one masters this network of objects, that is, if one knows for each object the most important information and partners, then with simple algorithms essential statements with a high added value can be made. The algorithms used are very simple. They are based on the rules of class/object, aggregation, compilation, inheritance, summation and probability. As already mentioned, the inventive concept is built up as a framework. On this basis it is possible to extend the models and definitions subsequently shown anytime and without a large effort.

One strategy when influencing or leading a complex system, e.g. a company, as a rule comprises different theses 110. Theses 110 can be interrelated. These theses 110 can in turn again consist of theses or of different goals 111. The goals of a thesis are defined, qualified, quantified, are ordered, are prioritized, and can be interrelated. The individual goals of a thesis always add up to a hundred percent. This signifies that in addition to the properties already mentioned, also a relative and an absolute weighting of a goal within a thesis and strategy exists. This is a consequence of the fact that the sum of all theses of a strategy is one hundred percent as well. By means of a preference matrix 112, in addition to the absolute and relative weighting, also a order can be determined and defined. According to this definition, the individual goals or theses of other objects within the inventive concept are associated. This association can be with an external agent, process, element on the support level, a work product, a requirement etc. With these associations it can be defined as to how many percent an object is affected by this strategy as well as to how many percent a strategy depends on an object or is covered by an object.

Figure 12:
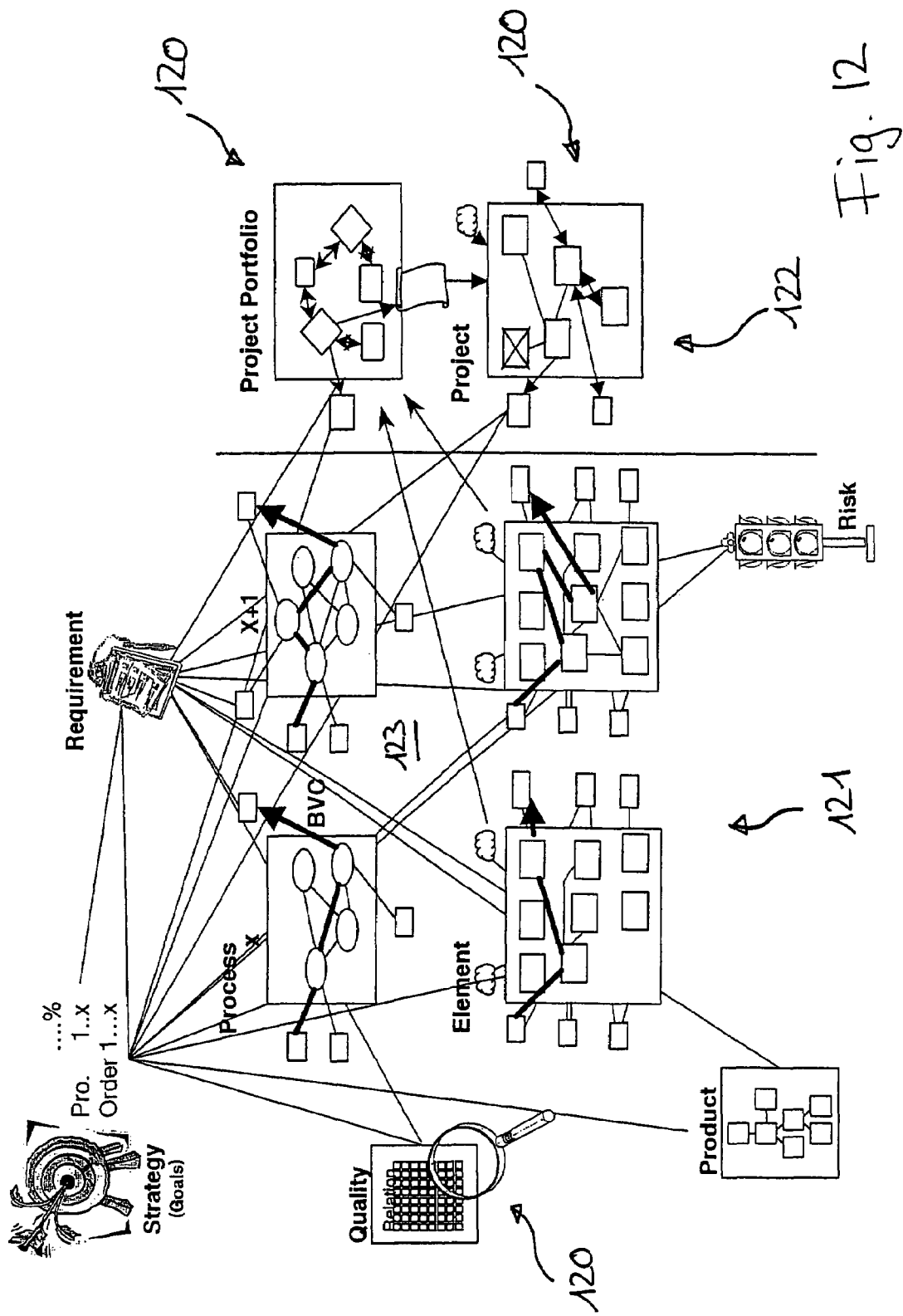
FIG. 12 the modeling of requirements.

FIG. 12 schematically shows how requirements 120 can be modeled. In order to successfully implement a strategy, requirements 120 must be defined. These requirements are divided into e.g. functional, factual, time related, person related and/or social aspects. Then these requirements are typified as quantifiable 121 and not quantifiable 122, such that they can be linked to other objects through a relation 123. As already described, there are different kinds of relations. The consequence of these kinds of relation is explained beneath. Requirements, just as goals, can be related to one another, defined, prioritized, sorted and associated with other objects. It thus is relatively simple to find out, how and in which form requirements are linked, how and what effects they can have on other objects.

Figure 13:
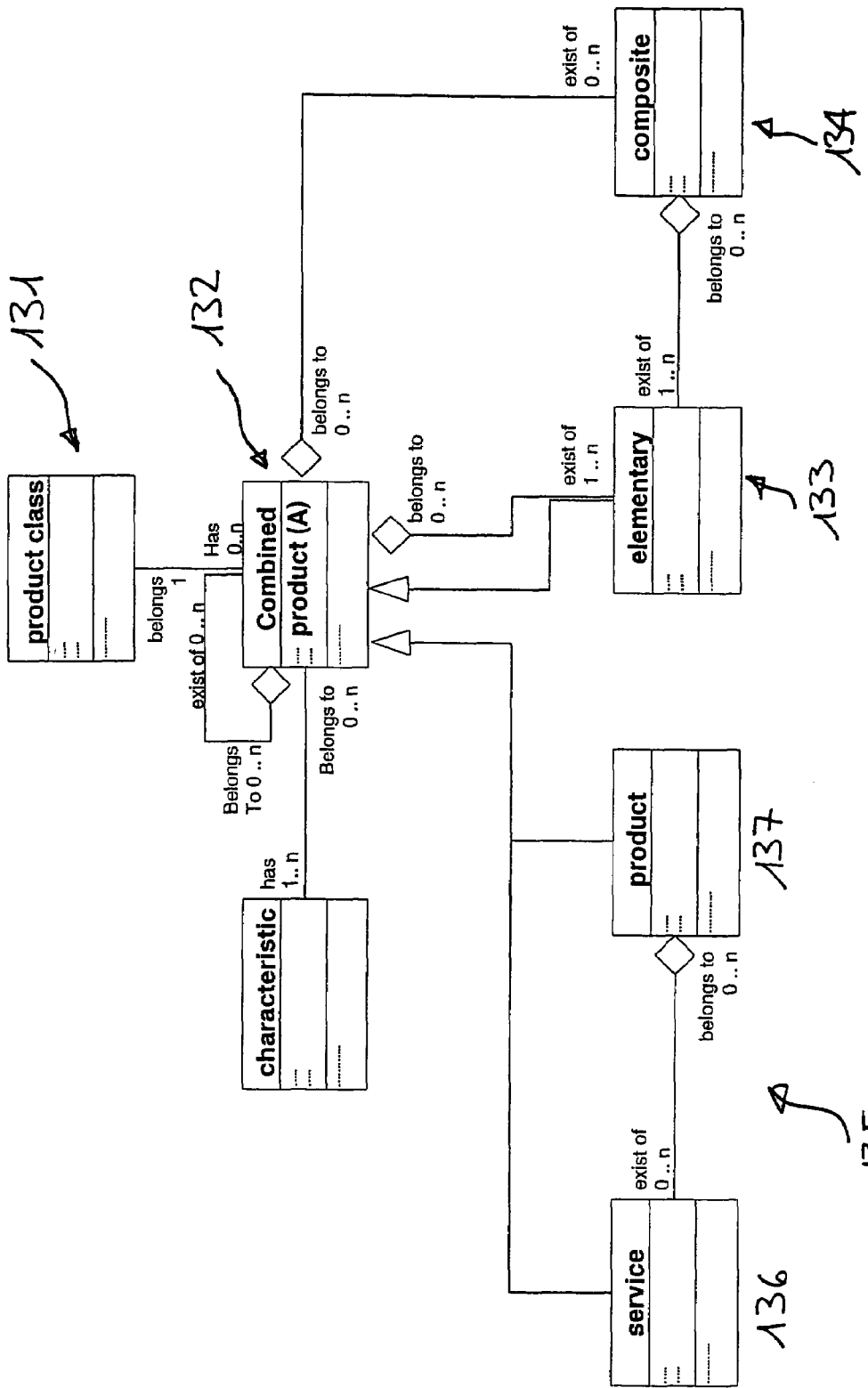
FIG. 13 a product model.

FIG. 13 schematically shows the construction of a product model. In the book already mentioned "Der Objekt-Orientierte Weg", henceforth called "OOW", processes, business value chains, components and classes are described in detail. The definitions mentioned therein are adopted in part in the following explanations.

For the processes the definition remains as supplied before. The business value chains are defined more clearly and put in a stronger relation with other objects. See for this the description of the figures (chapter 9.2 and 10). The components described in the book "OOW" were focussed strongly on developments in the field of IT. This focus was extended by infrastructure, organization, electronical and mechanical building blocks and physical means. This layer is newly denoted as (process) support layer. Based on these extensions significantly more statements can be made by the analysis of effects of this layer. Also the examination, expressiveness and rating of interfaces between the different objects is enhanced by this extension. For reasons of clarity only, the class layer was renamed as information and function layer. Nevertheless, the concepts of object orientation are applied consistently to all objects, but for clarity are designated differently. As new elements, the product, the strategy, the project portfolio and the requirement have been added.

FIG. 13 schematically shows a product model, represented in a simplified manner as a mathematical model. The product model is a new approach in the framework. In a product construction kit different kinds and parts of products and services are placed in relation to one another. A product class 131 therein represents a categorization of products. These so-called combined products 132 can be assembled from elementary products 133 and composite products 134 or from already defined combined products 135. With these combined products a standard rate, a medium or a further property can be associated. These are preferably represented by a class characteristic. Two representatives of combined products are known. The one is called product 136 and the other service 137. With this model any model of arbitrary complexity can be assembled or constructed. Of course, the objects goal and requirement as already described, as well as others, can be linked with the individual parts of this construction kit.

Figure 14:
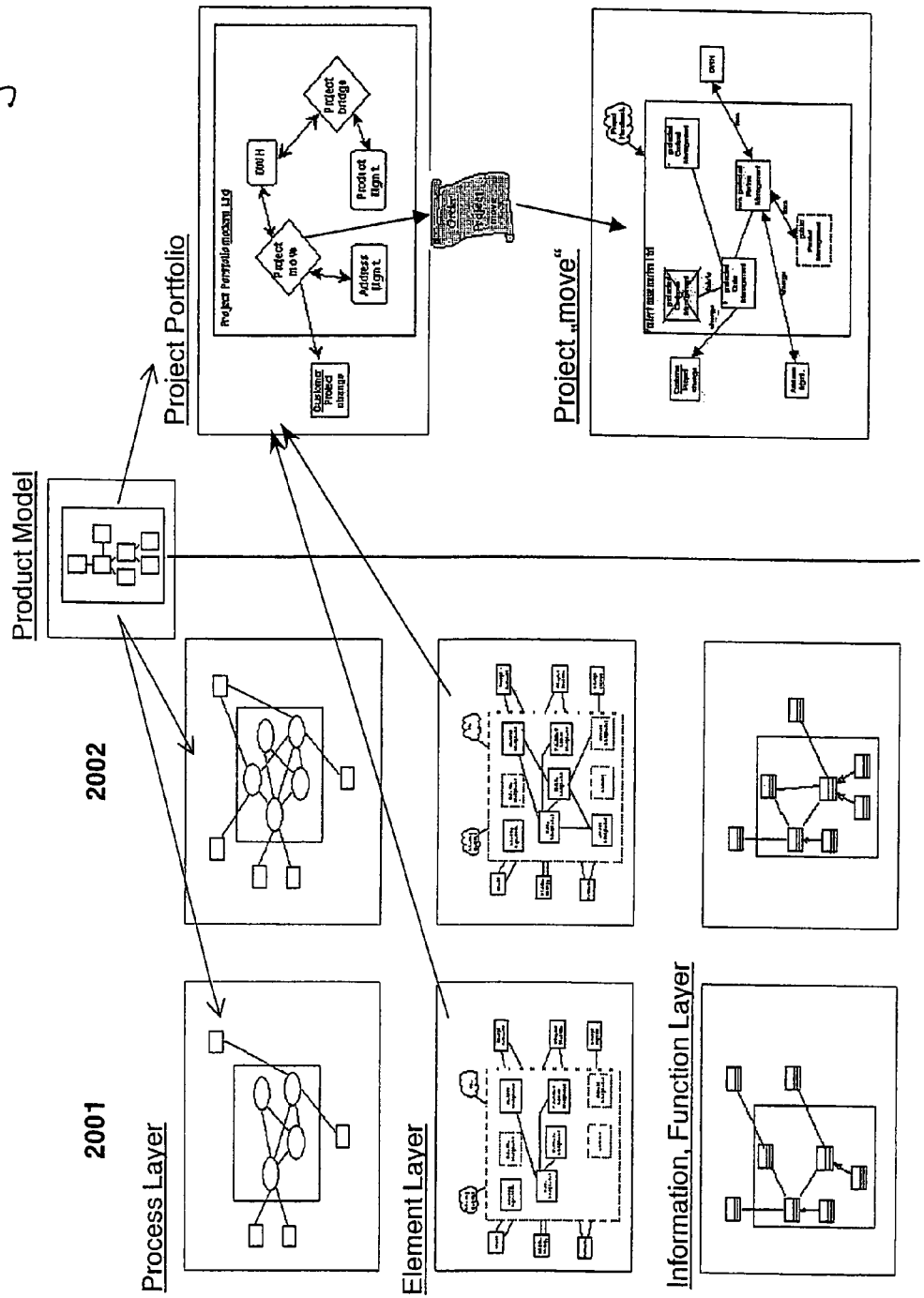
FIG. 14 a possible project management.

FIG. 14 schematically shows a possible project management. As already mentioned, the project management is defined as a need for action between two states. This principle is extended in the method discussed here by a creation of scenarios and variants. In this context one speaks of business improvement. The model is further complemented by the link to the product model, which again allows a further manner of perception. The models (process, element, information/function) defined on the different layers result in or represent a comprehensive state of a complex system, e.g. a company. These states can be copied, extended or reduced and represent either a scenario or a variation. By means of an elaborate algorithm all differences on all levels and all objects can be determined and represented as a change & compare list. This list with differences (delta list) represents the so-called need for action between two states which then e.g. is assigned to a project and can be applied to said project. The individual differences can then be assigned to results or templates (sum of results following each other, plan), which as a result corresponds to a project plan. This project plan makes visible on the one hand results and also activities with which the difference displayed can be worked out. Thus the inventive concept allows to analyze, document and also validate effects from the strategy up to the concrete project. With this procedure it is possible to standardize projects to a much higher degree, which in turn results in a higher stability, re-usability and safety. With this approach risks in enterprise development can be reduced massively, the efficiency can be raised, effectiveness and profitability can be increased.

Figure 15:
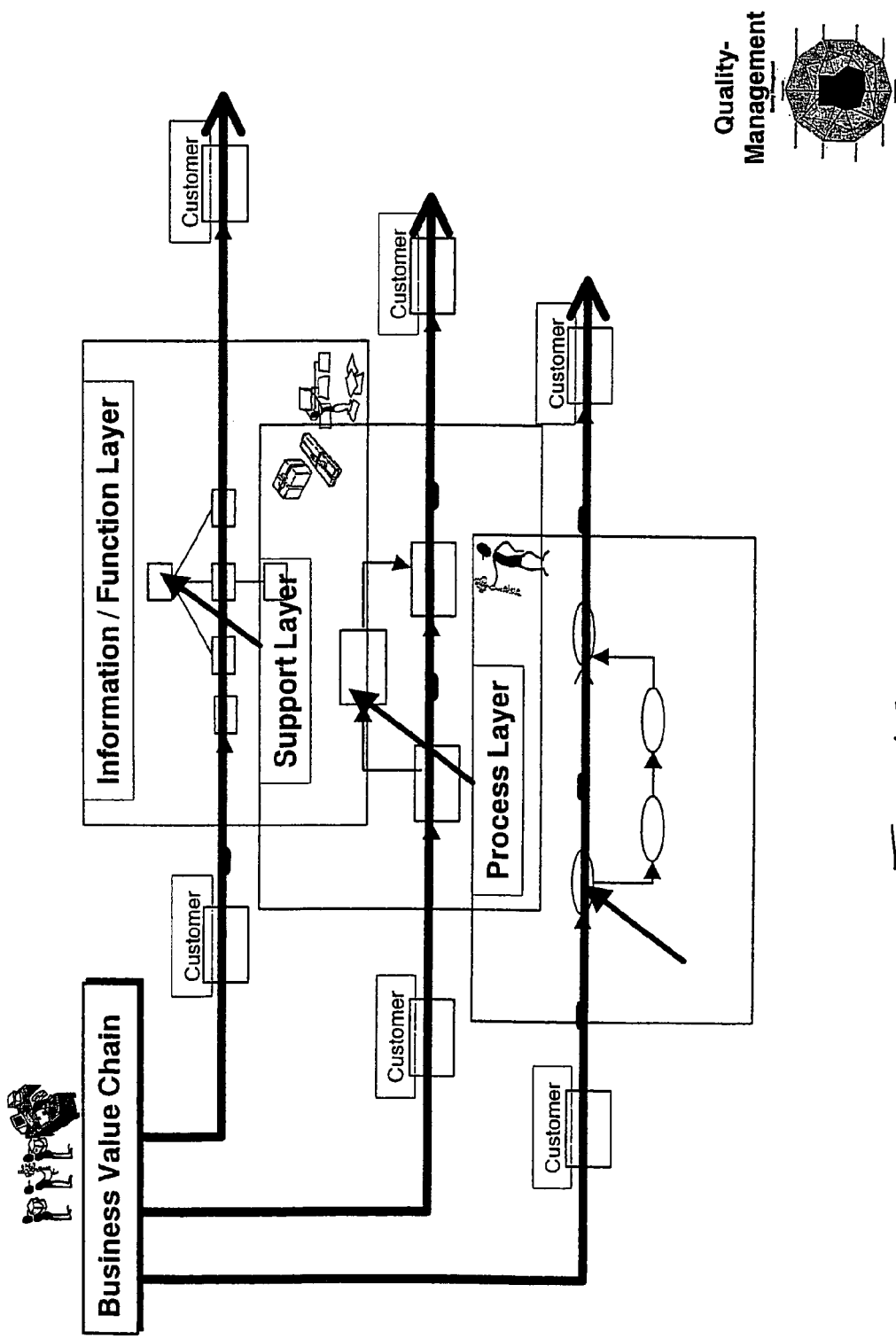
FIG. 15 a possible form of quality management.

FIG. 15 schematically shows a possible form of quality management, The quality management in the disclosed concept is based on the interconnection of objects. This networked approach allows to validate the modeled and documented models. Under validation, the testing of states, process sequences and models by means of at least one further model is understood. If, for example, the sum of all defined business value chains is compared to the process model and its definition, a conclusion about the quality of the process model or the business value chain can be made. Thus, the principle of quality assurance consists in determining and showing the quality of a model by means of one or more other models. Showing the quality can happen either in terms of a characterizing number or by means of detail information.

One of the elementary objects considered is the business value chain. A business value chain is a systematic sequence of events and actions. By extending the pure event/action approach by means of work products the possibility also arises to make a statement regarding the quality of e.g. a process. This rests on the basis that every input and output of a process is generated by means of a business value chain.

As represented in a matrix, on each side the processes are listed, and in the corresponding cells the work product that is moved from one process to another process is entered. In this manner an overview over all interface objects is obtained. If the same matrix is used to enter the work products used by a business value chain, a certain overlap can be seen. For a work product that does not show an overlap, either the process definition or the definition of the business value chain is incomplete. The same principle can also be extended over the model layer, whereby again a conclusion about quality can be derived. In summary this means that the quality of a model always is checked with one or more other models. With this method the completeness, the consistency, and conditionally also the correctness of models can be checked. Furthermore it is shown in a very transparent manner who uses what and when. In the case of correctness it is assumed that it is higher if two independent definitions (models) lead to the same result. This principle can also be applied over different model layers and object types. For example, a business value chain on the process level and the same business value chain on the support level are compared to one another. In this approach, by considering that the process and the supporting element are interlinked, a quality statement about objects on different levels can be made. Implicitly, this can also be done for the quality of the business value chain itself.

Figure 16:
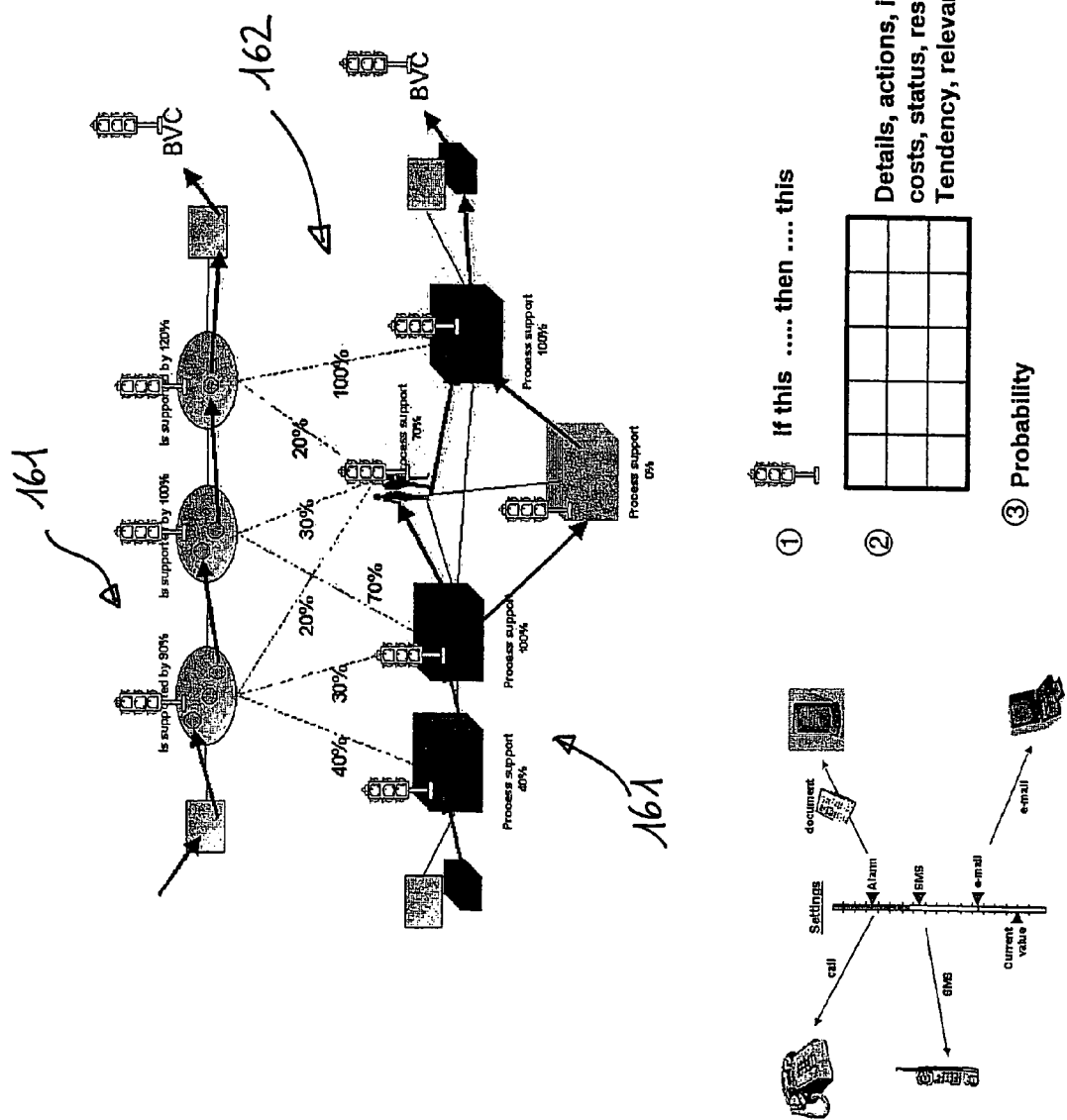
FIG. 16 a possible form of risk management.

FIG. 16 schematically shows a possible form of risk management. For calculating and propagating risks, in a simple representation, the following principles apply. For each object 161, if necessary, one or more risks 162 are defined. For each risk in turn a definition, e.g. a probability of occurrence, a trend, a early warning indicator, net and gross risk, costs, one or more actions for avoiding the risk as well as basis and dependencies of the risk itself, is defined. These dependencies can run along the network already defined, but can also defined in another manner. The computation of risks then is based on the network and the percent distribution of the same. If one wishes to determine the risk along a sequence (e.g. a business value chain), then the largest risk determined is considered as the risk of the entire sequence, as long as the influence always is positive and in the flow direction. If further risks affect the sequence as influencing factors, then depending on the risk effect and direction, the risk value is determined. In this place one also speaks of risk appetite. With the risk appetite the sensitivity of an object to react to a risk is description. Depending on this network, later also the alarming is done.

Figure 17:
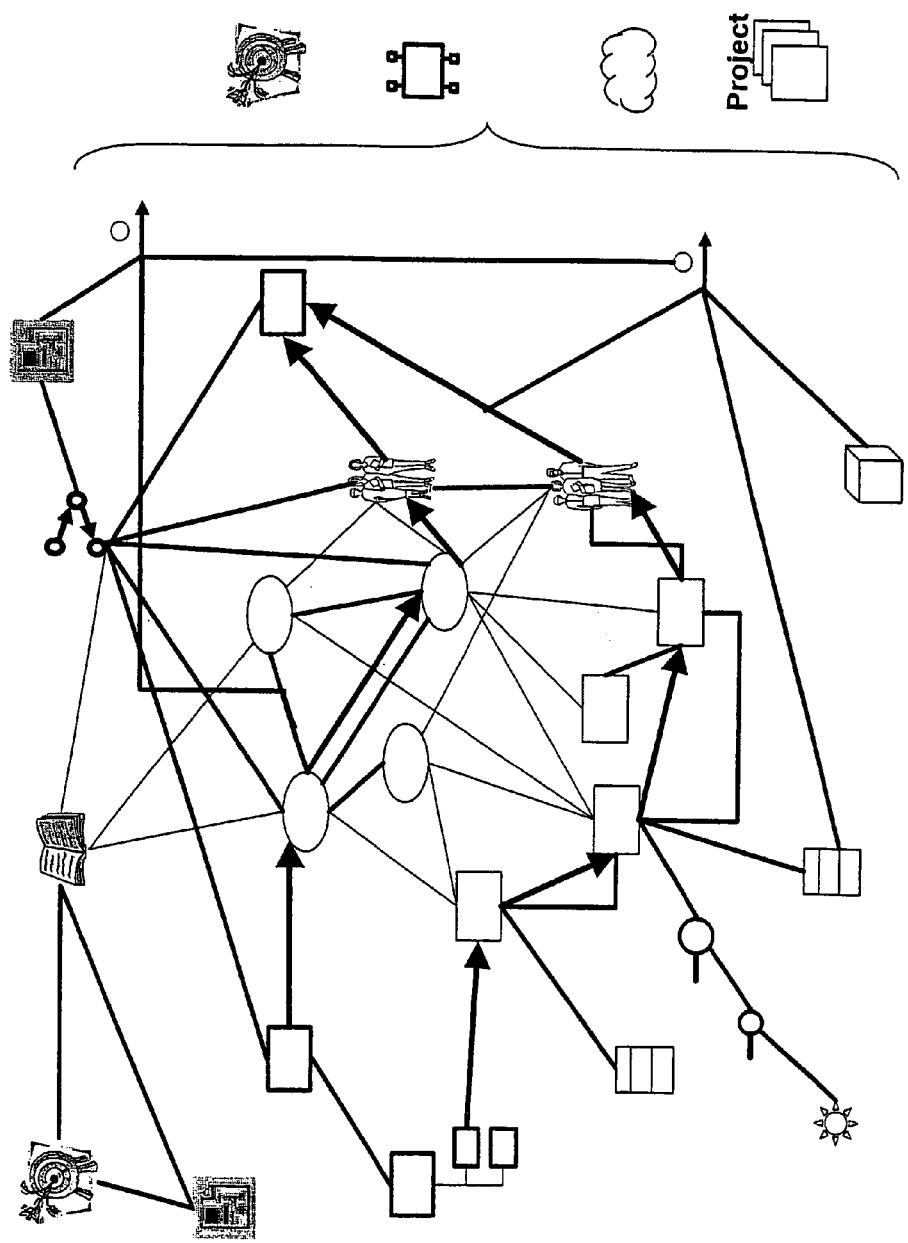
FIG. 17 dependencies that occur when creating models.

FIG. 17 schematically shows dependencies that occur in the abstraction and creation of models. In a simplified representation the fundamental concept is based on three basic principles. First, on a meta-model, second on the basic principles of object orientation (encapsulation, inheritance, class/object etc.) and third on the idea of networked thinking and acting. All objects stand in a defined relationship to one another and comprise a clear definition. Regarding the networking of the individual objects it is to be remarked that there are relations that, according to the methodical approach, already exist depending of the object type (e.g. business value chain/work product, process/work product, process/element) and such that are entered by a user (e.g. goal/requirement, requirement/element). In the first case, the relations come into being by definition (by rule), in the second case it is defined, derived by the user (e.g. external agent/requirement).

Each relation between two objects that is built by a user or created by the system can accept different definitions. Which definition makes sense can be determined by the user or is defined and/or limited by the system, as they do not make sense. A process that is bases on a model can for example only be decomposed. The process on the decomposed level for this reason is also called subprocess. A typification of processes on the process model layer does not make sense at all. In the event of a business value chain, it can be freely chosen whether the child business value chain is a type or an aggregate, a decomposition or if it only stands in a relationship with the parent. If one generates a simple relationship (e.g. between risks), then in addition to the direction, the influence (positive, negative) and the significance, also the weighting is to be defined. When the system carries out calculations, then different results arise according to the relationship type. When, as an example, computations for a business value chain are made, depending on the influence and direction, additions or subtractions are carried out. If loops arise, factors are used in computation. It is to be observed that there also are relationships for which a qualification does not make sense. (e.g. process/support element).

Figure 18:
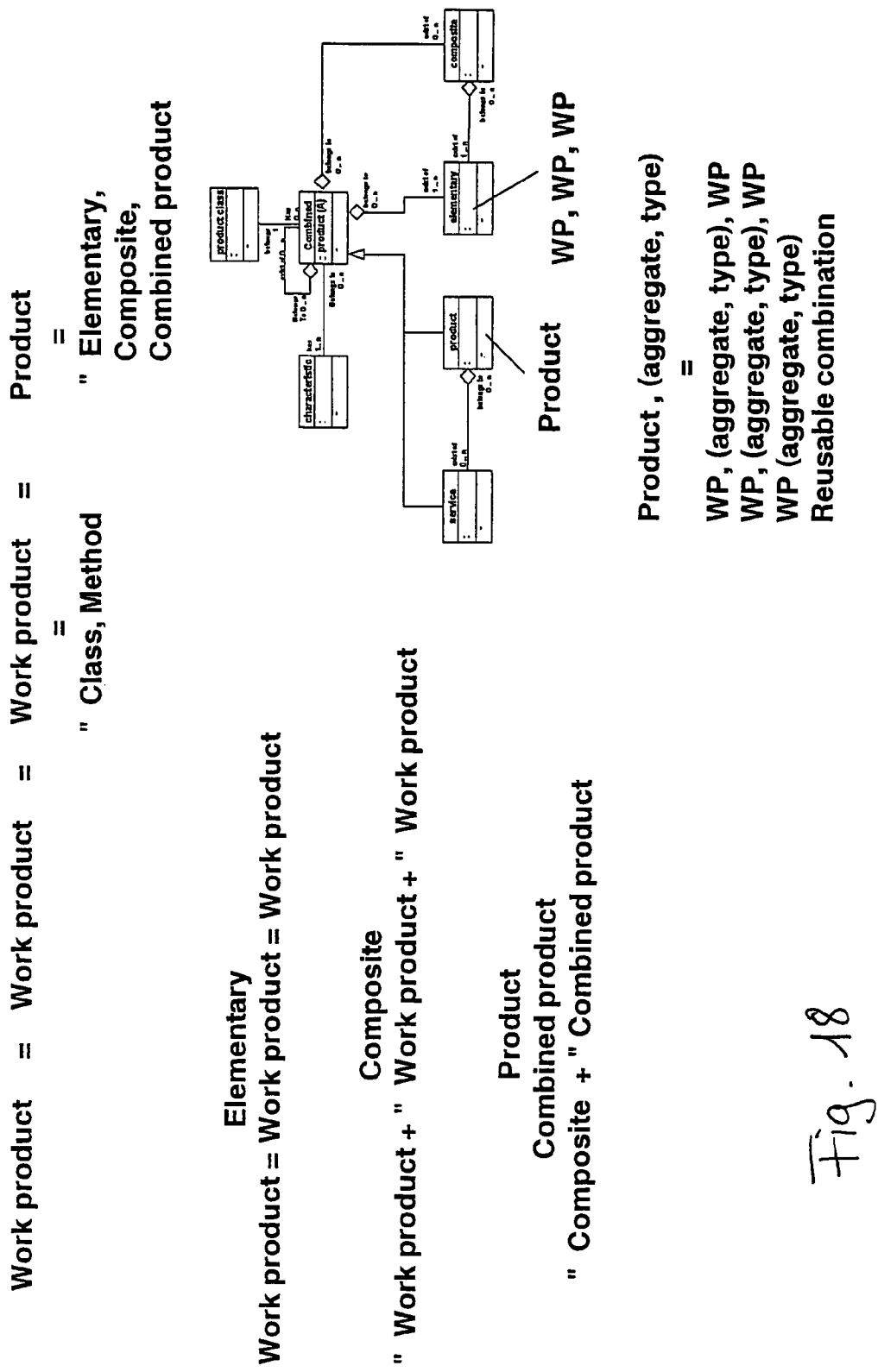
FIG. 18 a comparison between work products and products.

FIG. 18 schematically shows a comparison between work products and products. The work product and the product assume a special position in model creation. The work product and the product and also the work products among each other can stand in different relationships to one another. It is important that this interaction must be precisely defined, such that no wrong information is derived from the models created. In FIG. 18 some of these definitions that show how the existing models interact are assembled. This interaction can influence the quality management, the risk management and the cost management. It is important that a work product on different levels can be similar or, on the other hand, very different. In an extreme case it can even correspond to a part of the product model or a product itself. Furthermore, a work product can also assume any defined form of relationship to another work product (aggregation, composition, etc.). Evidently, a work product as well as a product can assume different states. These states can be, for a work product order, e.g. order being processed, order suspended, order completed. When modeling, this means that it is not necessary to create a dedicated work product for each state, but rather that only its property can be changed. This is an important basis for reducing an immense variety of a work product. When working with work products it is always important to know whether one is talking about a definition (order) or an instance (e.g. order by A). Normally, only the definitions are modeled. In this context it is important to note that states of a work product often are generated or changed by a business value chain.

Figure 19:
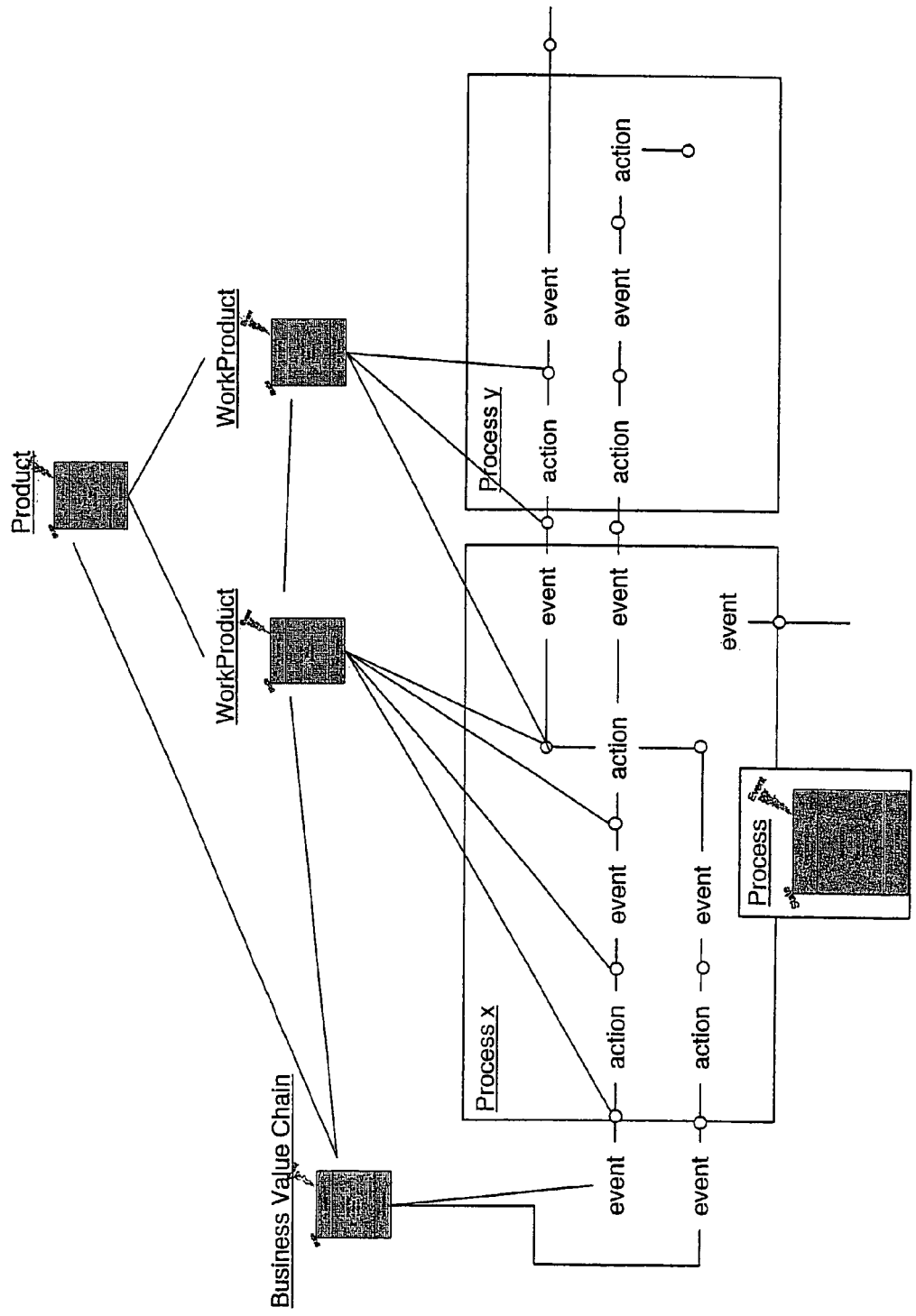
FIG. 19 an analysis of effects.

FIG. 19 schematically shows an analysis of effects. The network defined in model creation serves to analyze effects. Effects can not only be computed along the relationships but also via states of interlinked objects. For example, each work product comprises at a given moment in time a specific state. The object has reached this state by certain preconditions, rules, etc. This state can be changed by an event. Via the relation to the product the product as well can be changed implicitly. By defining during model creation, that a business value chain in a simplified view is a value creation chain or part of such, a relationship between a step of a business value chain an a work product comes into being. Since a step of a business value chain always is associated with a process, a strong connection to the process arises.

If this basis is examined a little more closely, the states of a work product along a business value chain can represent a comprehensive effect on a product. From this and other derivatives from relationship sequences, good and qualified statements regarding dependencies and effects can be made very efficiently. This connection between product/work product and business value chain and the interpretation of this interaction is but one of many advantages of the approach chosen.

Figure 20:
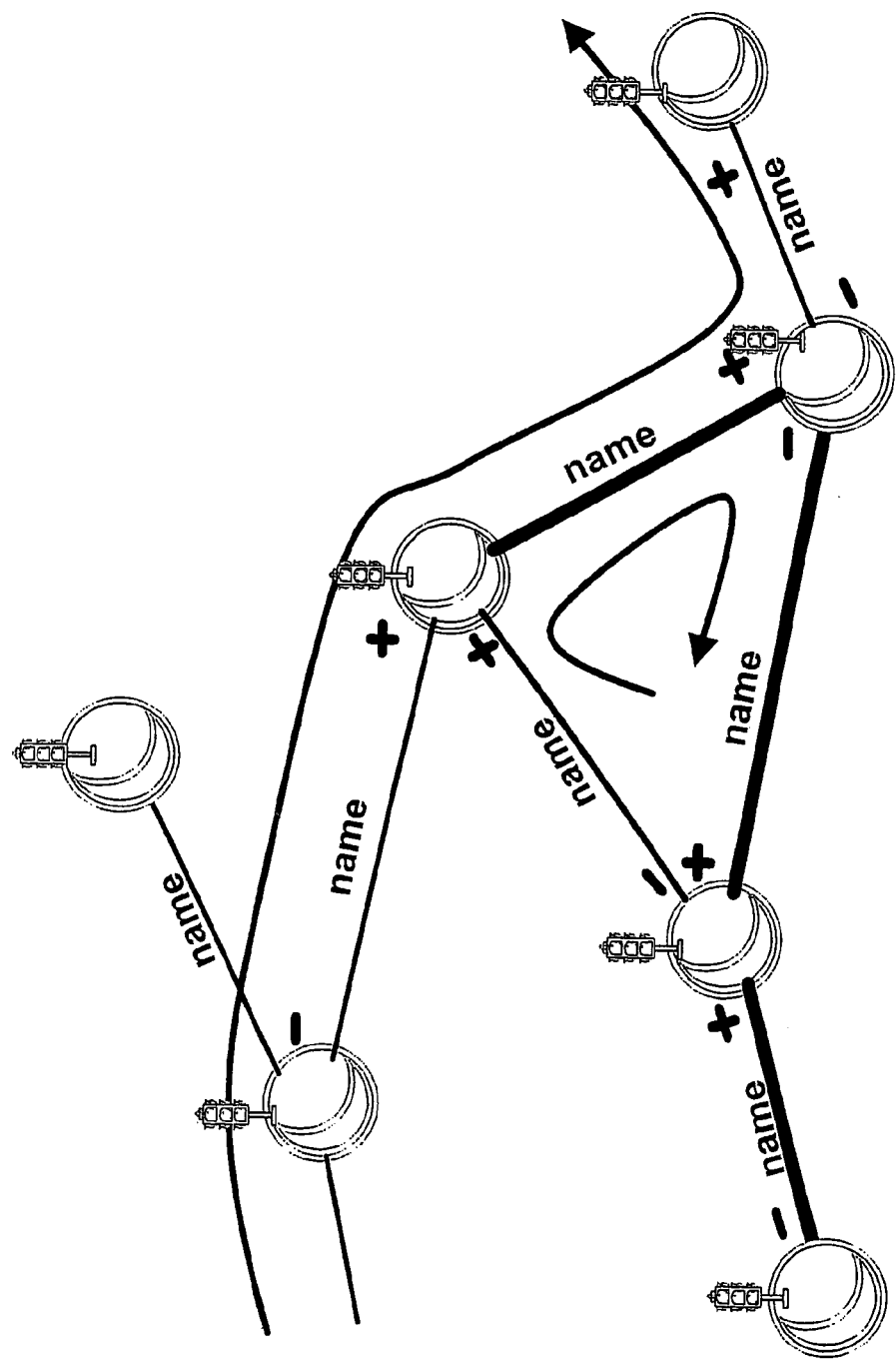
FIG. 20 risks and their interrelationships.

FIG. 20 schematically shows risks and their interrelations. When considering risks, as a rule, the same rules already mentioned further above hold. On the one hand, the type of relationship is important, an the other hand the influence is. Based on these two foundations risks can be determined. By interlinking elements by the possibility that an object may only correspond to a representation (aggregation) of several other object, loops may also arise. These loops can influence overall risks. This example is meant to show how difficult it is to compute risks. For this reason it is, as a rule, advantageous to create a dependency diagram, such that the effects are also visually identifiable.

Figure 21:
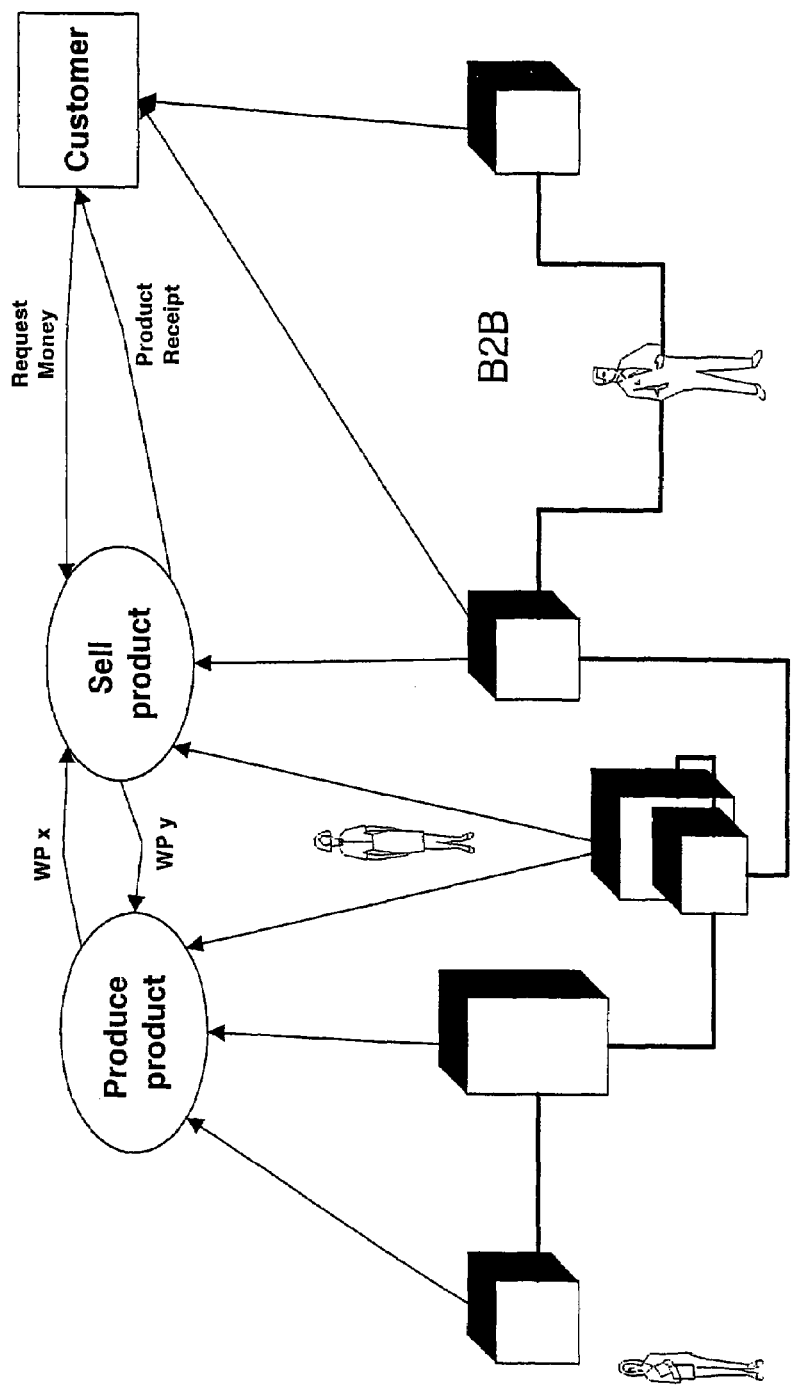
FIG. 21 a generation of scenarios and variants.

FIG. 21 schematically shows a generation of scenarios and variants. When a process landscape is built according to the modeling process explained above, an ideal support by systems can be created according to different viewpoints. This creation of scenarios happens by the application of different algorithms. In this, it is advantageous to use as few interfaces as possible. Ideal process support, ideal business value chain support, small costs etc.

In FIG. 21 in a simplified manner a variant of such a generated solution is shown. The inventive approach in such generations establishes its own account models that can be compared by means of merge & compare. The individual solutions are created according to predefined best practices (patterns). Thus, theoretically possible results are excluded because of missing relevance to practice.

Figure 22:
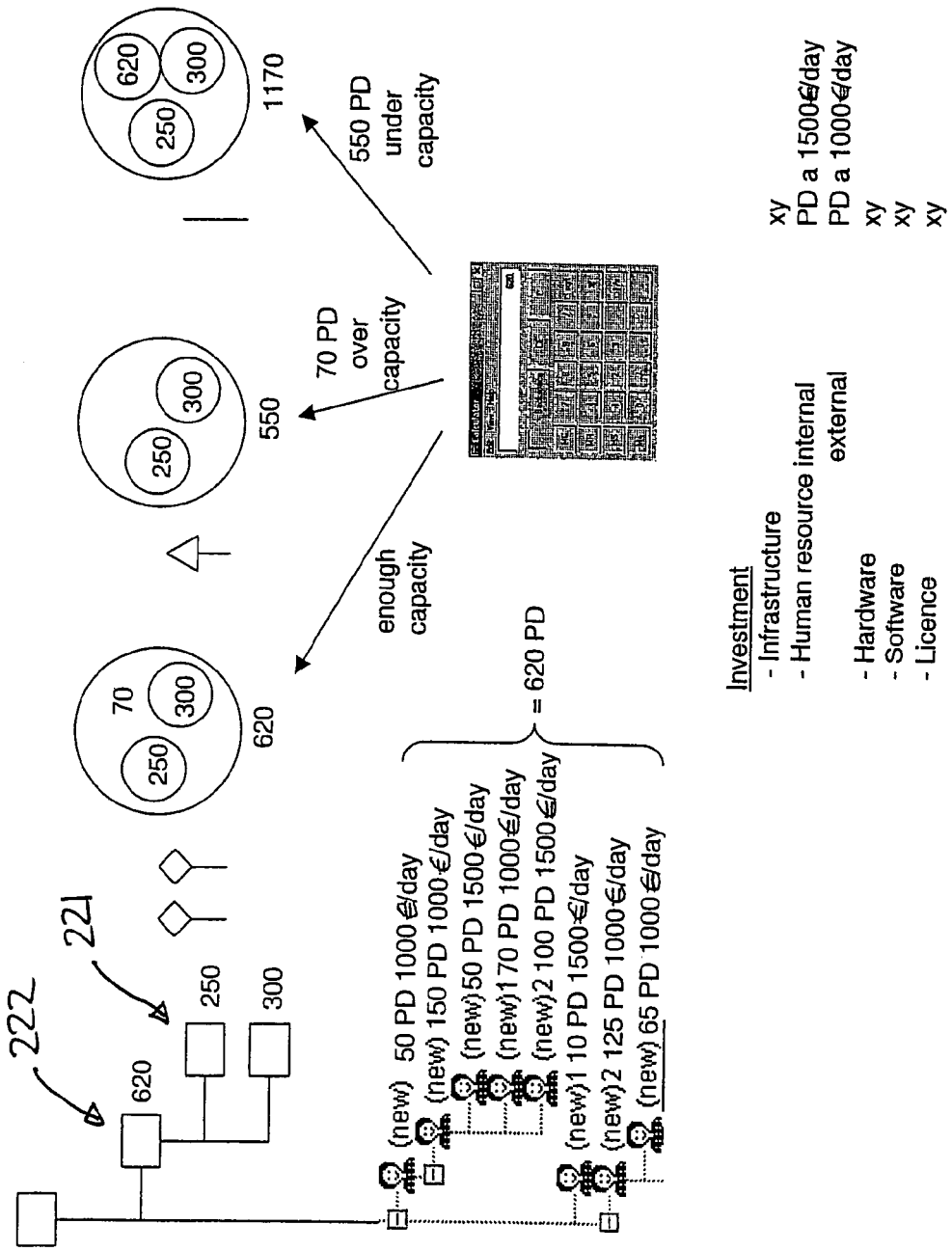
FIG. 22 a possible form of cost management.

FIG. 22 in a simplified manner shows a cost management and the preferably used computation algorithms used therein. Computations of costs are always based on the kind of network or the relationships. As can be seen from FIG. 22, e.g. the sum of three systems is computed differently, according to the kind of relationship. If the two child aggregates 221 are dependent of the parent aggregate 222 and the parent aggregate 222 itself has a value, then the value of the parent aggregate is the difference to the sum of the two child aggregates 221. If the two child aggregates are of the type parent aggregate, then the value of the parent aggregate is irrelevant. However, if the two child aggregates stand in a normal relationship to the parent aggregate, then all three values are added.

The costs on a element may be put composed in different ways. In FIG. 22 a possible subdivision is showed in a simplified manner. If e.g. it must be computed whether in a given period the available resources are sufficient, this can happen by accounting the available resources with the investments. By the fact that, as a rule, three different relationship sets exist, for each scenario a different value is computed. In one case, it works out even. In one case an over capacity and in the other an under capacity is computed.

Figure 23:
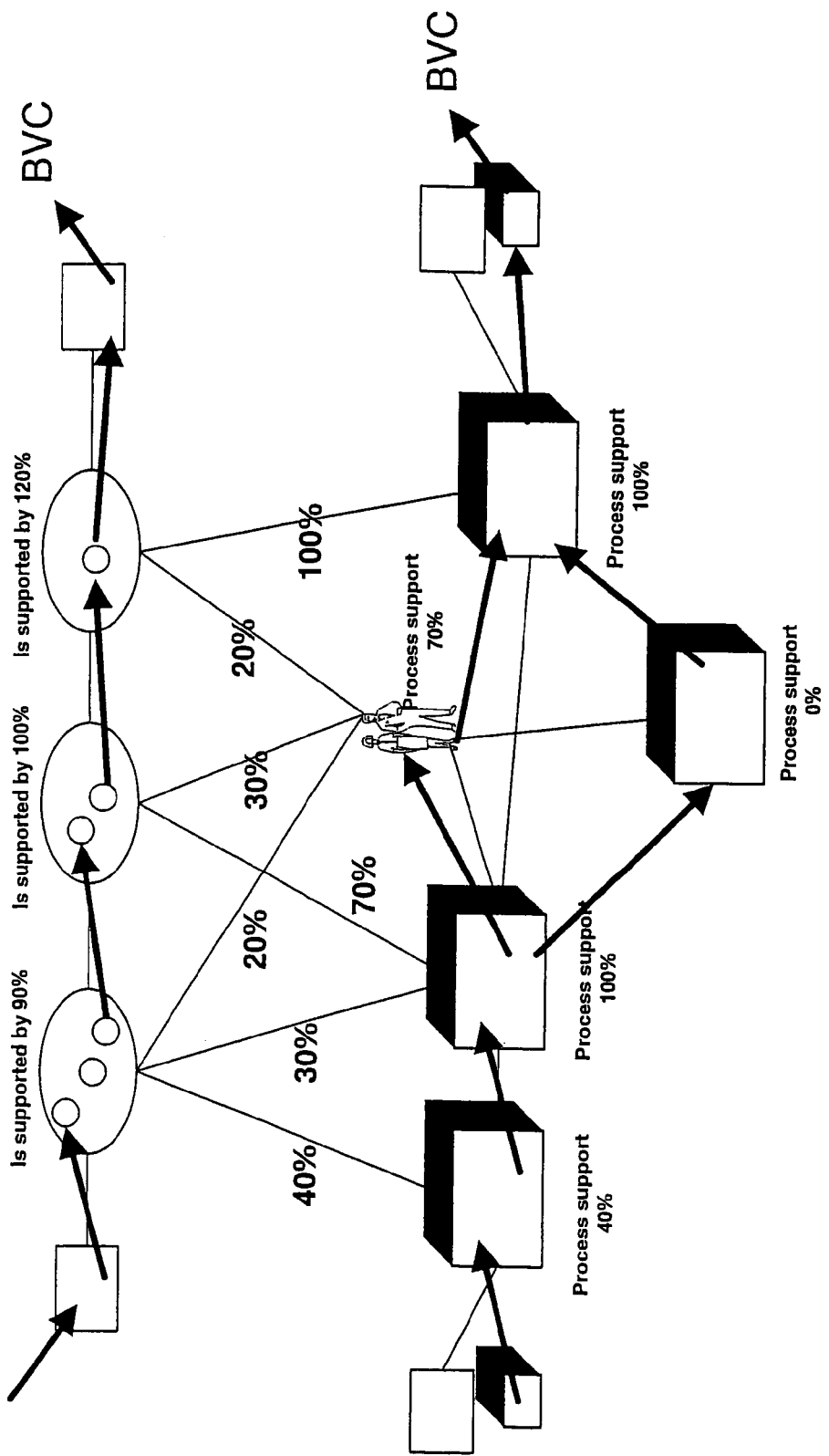
FIG. 23 the relations between different systems.

FIG. 23 in a simplified manner shows different systems that stand in relation to one another and support one or more processes. In the example shown, the process is traversed by only one business value chain, which in a practical application is rather an exception. In order to compute the process costs, here the system costs are summed proportionally to the support percentage and shown as process costs. Addition is also performed when the degree of support is more or less than a hundred percent. Only when calculation is performed in the inverse direction, as a rule do differences get visible. In this case it is computed how much of the costs of a system can be allocated to whom. If a system does not support a process, then the costs are just distributed over the business value chain. If the costs of all business value chains are compared to the process costs, a difference (delta) arises according to this situation. The costs of a business value chain as a rule are computed from the percentage share of the process costs. If the case occurs that the sum of the business value chains is less than one hundred percent of a process, the value of the performance of a process will suffer a dramatic slump. Based on these simple calculation models already something significant can be said about the process costs and their origin.

Figure 24:
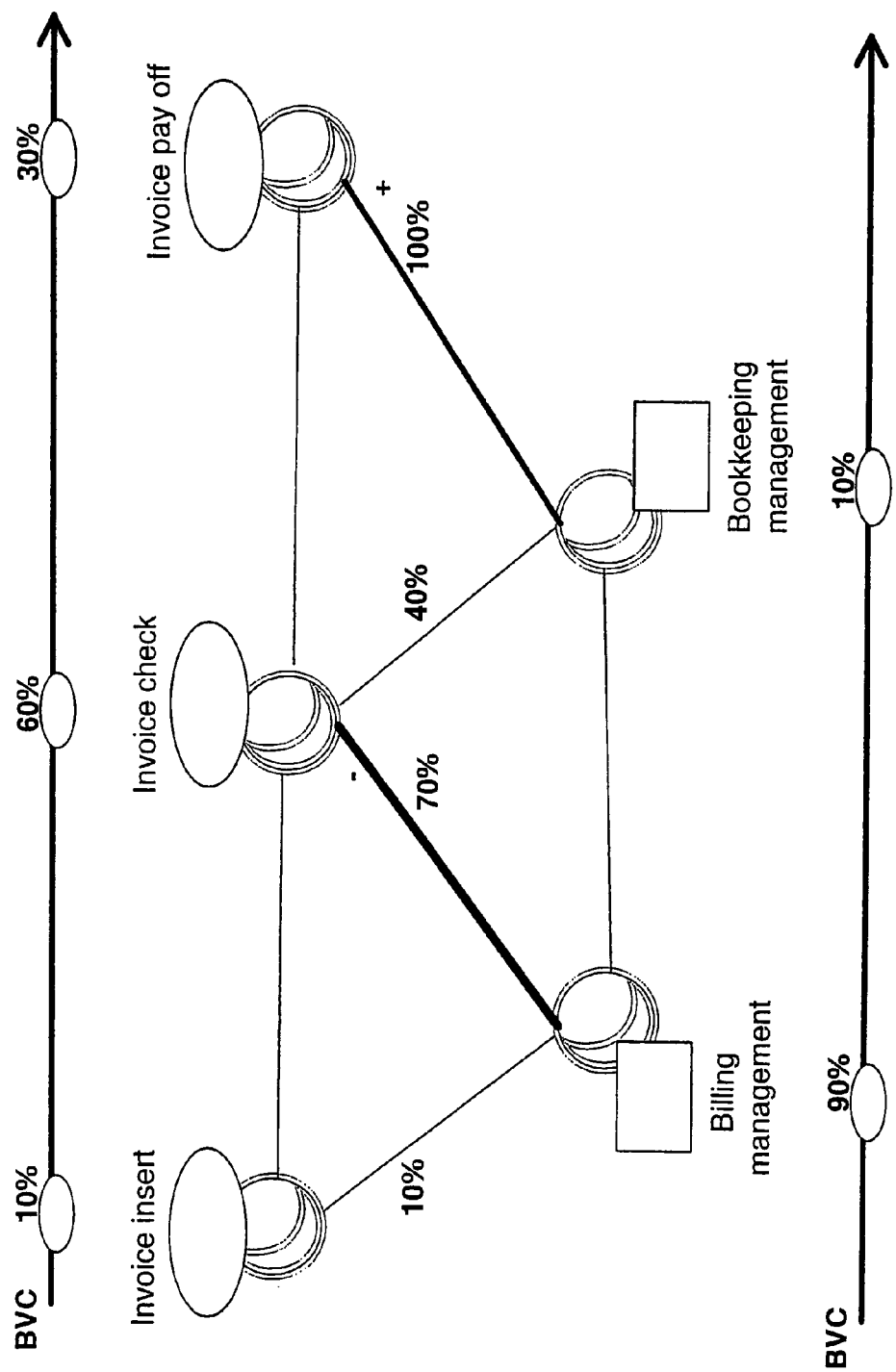
FIG. 24 a risk management and the computation algorithms used therein.

FIG. 24 in a simplified manner shows a risk management and the computation algorithms used therein. For computing overall risks there are different approaches. For example when considering the individual risks shown in FIG. 24, several things can be derived. A typical business value chain, by not defining any own risks, on the process level becomes yellow. This is because sixty percent depend on a yellow process. It might also be red, since a hundred percent of the third process are supported by a red system and a positive dependency is listed. The business value chain on the system level clearly is red, since it passes through a red system. This is the case although the red system shows only an allotment of ten percent. The gross and net risk costs arising from this situation can be determined according to the cost formula.

Figure 25:
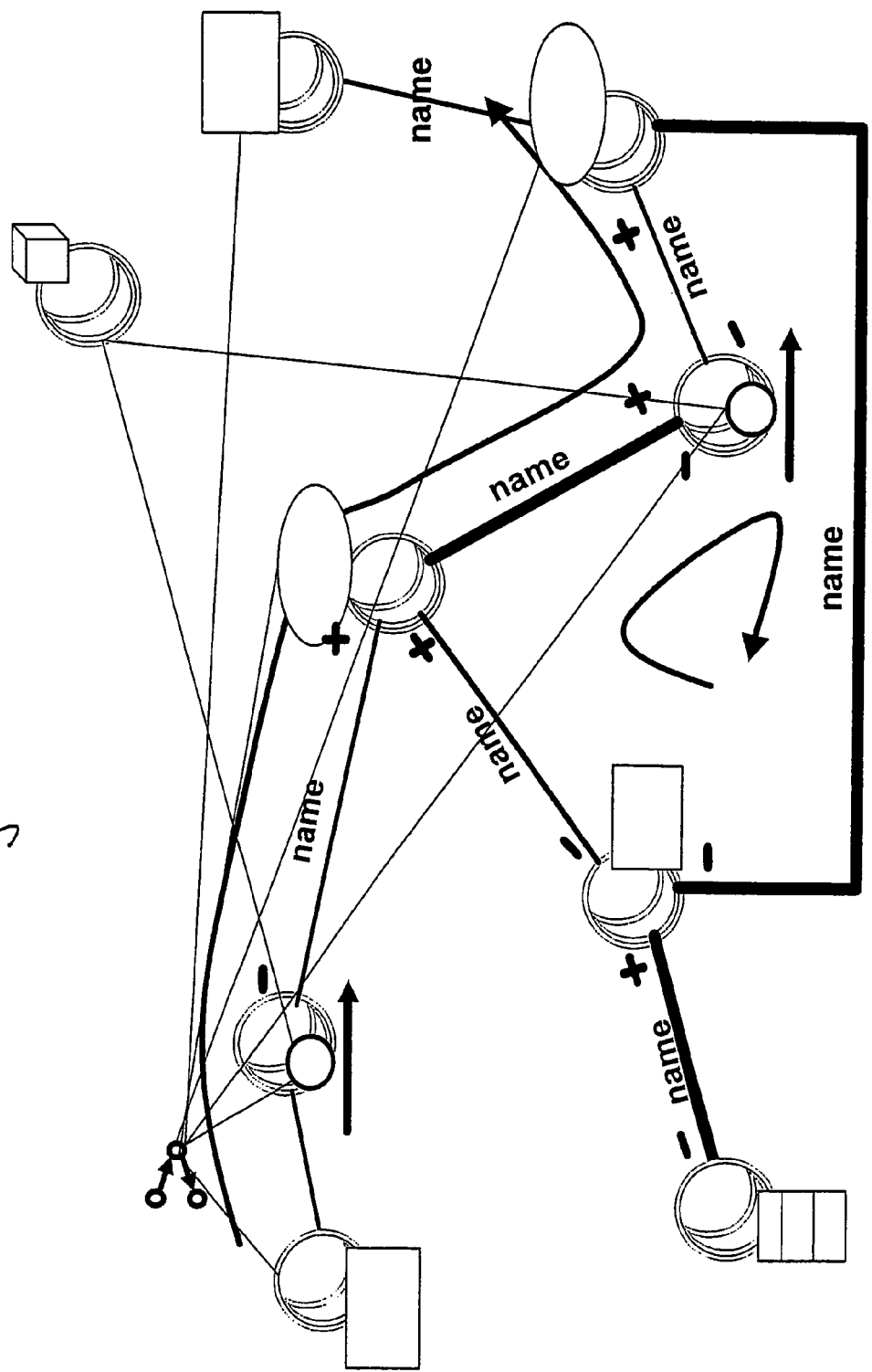
FIG. 25 a dependency between multiple processes.

FIG. 25 in a simplified manner shows the dependencies between multiple processes. Already in simple models very complex dependencies can arise. For this reason it is important to visualize the dependencies of risks and to discuss them, especially when trends and overall risks are involved. The example shown in FIG. 24 shows maximally two instances of each object type. Nevertheless the risk is difficult to determine since on the one hand strong dependencies and on the other hand loops exist. For this reason, when computing risks over the dependencies, always the worst is used. We are conscious of the fact that then always the worst case is assumed.

Figure 26:
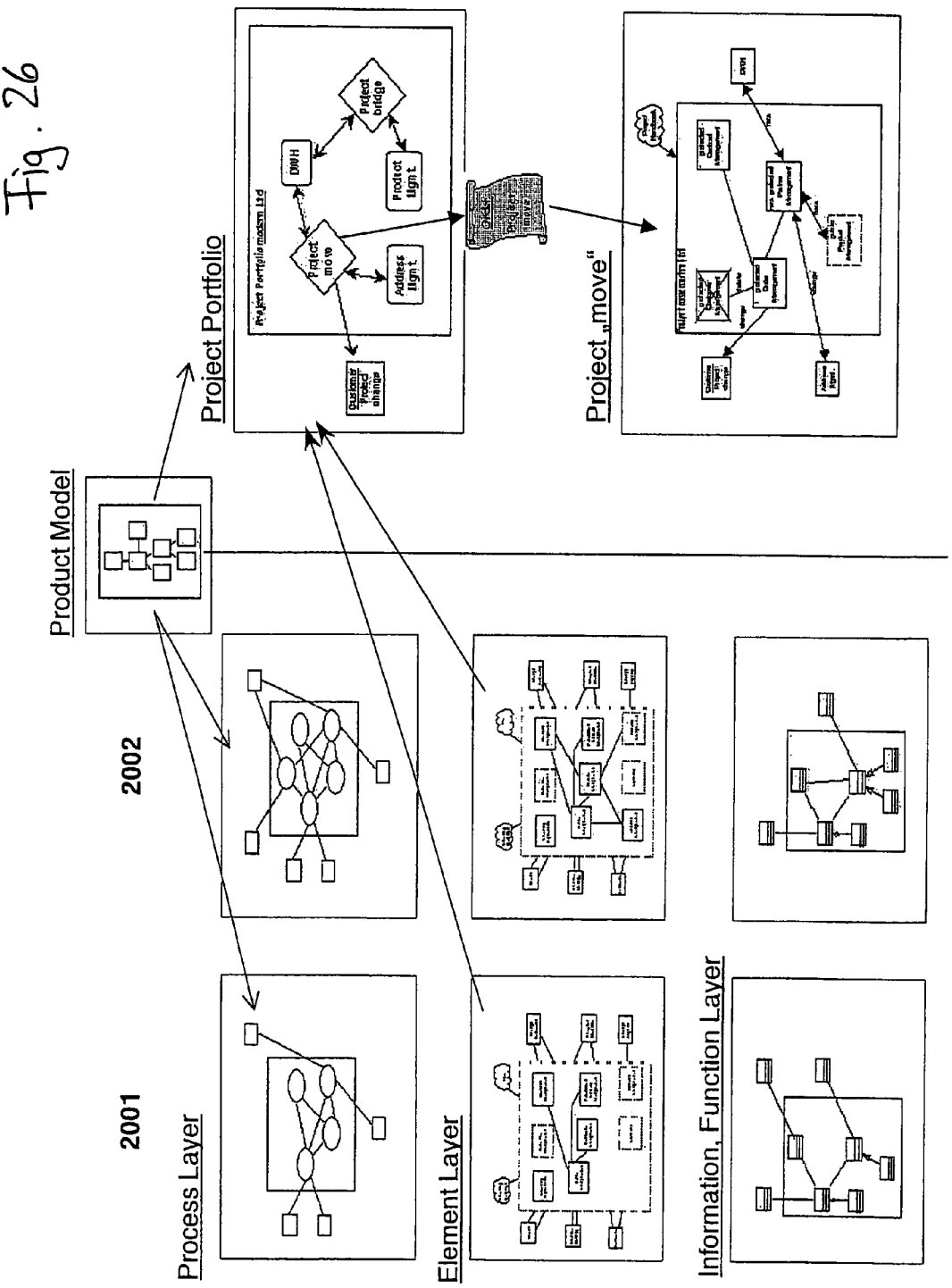
FIGS. 26, 27 a reference model, and a reference model process, respectively.
Figure 27:
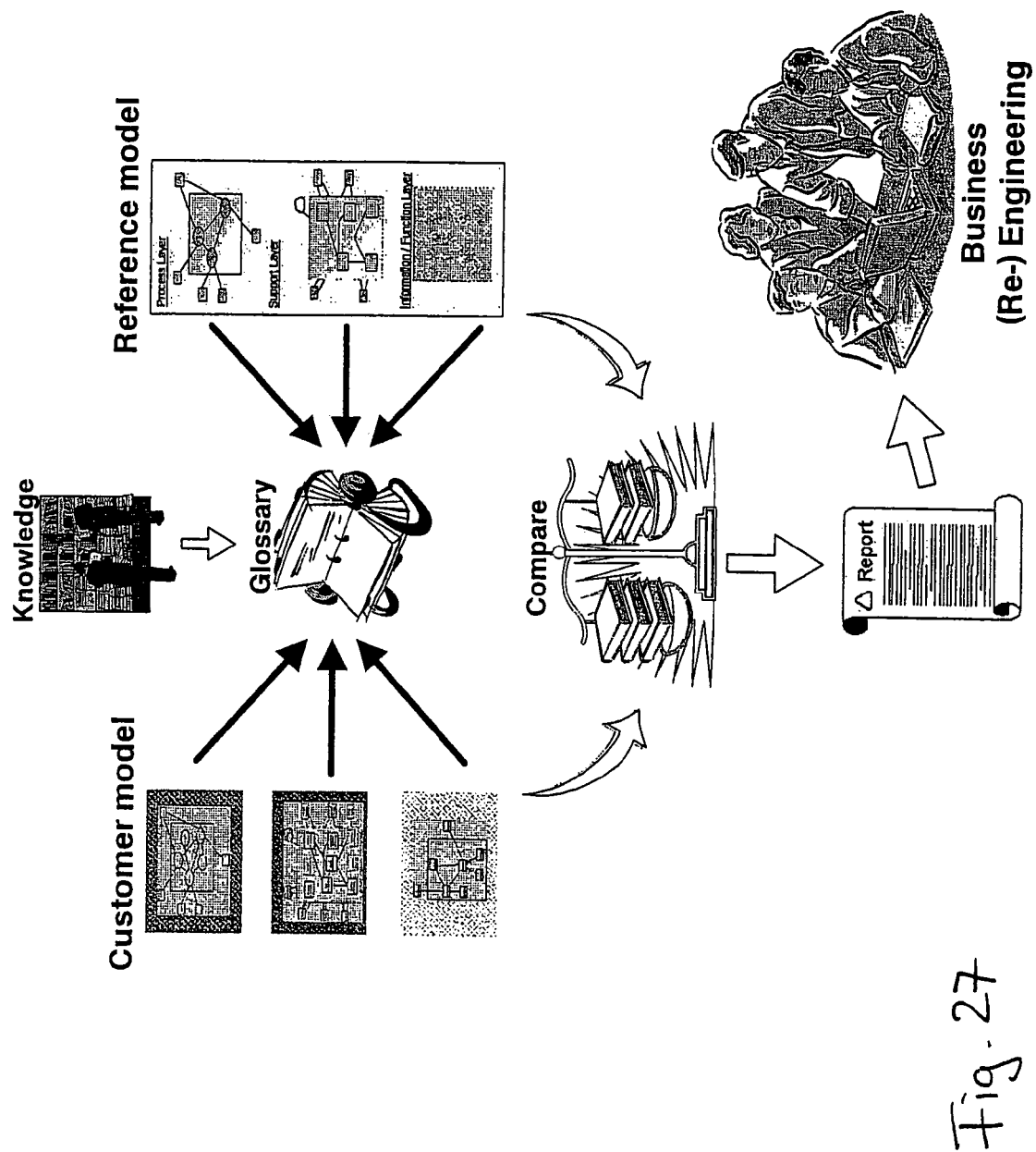

FIG. 26 shows a reference model, FIG. 27 respectively shows a reference model process. When in the context of the invention a reference model is mentioned, this refers to an ideal state. The reference model, for example, represents a standard solution in the field of ERP. The solution builder (e.g. SAP) constructs his solution along the ideal state. In consequence, the supported processes, the defined components as well as information maintenance and function assignment are ideal. This basis, as a rule, creates problems during the configuration and introduction of a model in a complex system. If it is assumed that the model creation represents the ideal state and the system operator (e.g. manager, client) documents the current state, then without much work it can be shown which integration scenario the smallest effort results. Furthermore it can be shown where the risks lie, what costs arise and what changes in quality are to be expected. This procedure saves the system operator as well as the integrator huge efforts during the analysis phase/design phase as well as the implementation phase.

Any differences (delta) are determined by means of the same Merge & Compare algorithms that were already mentioned for application in the creation of scenarios and variants. A mapping procedure is added, which in a simplified manner is denoted as a glossary. With the help of this glossary on the one hand definitions and on the other hand also different terms, definitions, models on different levels together can be compared. By means of this procedure it is not necessary to adapt the reference model to the customer state, but to construct it interactively. Based on these results the system operator can quickly define the necessary migration project and show the effects.

A further advantage of this procedure consists in that e.g. a complex system such as a company can be ideally transformed to an implementation date. The same principles can also be used for a release management. Before the implementation it is possible to show in a most simple manner what effects the new release will have on the current state. What functions are used or cannot/should not be used and who is affected. By means of the same functionality, effects on clients can be analyzed as well.

FIG. 28 shows different reports 281 that can be created according to the procedure described and the software that implements the procedure. On one side lists and detail reports with relationships (links) of the individual elements can be generated. The documentation preferably takes place in a text processing program such as Word, or in HTML or in a neutral format such as e.g. rich text format (rtf). In these formats all cross-references are output as well. Furthermore, matrix form representations are especially suited for documentation. Matrices are used mainly where the demonstration or analysis of relationships stands in the foreground. Furthermore, models can also be output in graphical form. Information can also be transferred to other tools. Thereby, preferably interfaces based on XML (extended markup language), Flat-File, API or other database formats are used. Of course, bi-directional interfaces can be realized as well, if desired. These interfaces preferably are based on a meta-model and are constructed and created according to the framework described.

The invention claimed is:

1. A method for modeling, documenting and validating a production system, preferably a company, comprising the following steps:
   1) providing one or more sensors in the production system,
   2) defining data to be recorded by the sensors,
   3) parameterizing the data to be recorded,
   4) representing the parameterized data by software objects with parameters,
   5) modeling products of the system by software objects that are product models, a product model comprising a representation of a product on at least two different layers of abstraction,
   6) modeling of one business value chain occurring in the system, a business value chain being a sequence of events and actions, by at least two business value chains in the model, the two business value chains being on different layers of abstraction and corresponding to the layers of abstraction on which the model is represented,
   7) linking the parameters of the software objects by relationships,
   8) recording the parameterized data by means of the sensors,
   9) updating states of product models according to events occurring in the at least two business value chains on the different layers of abstraction,
   10) automatically analyzing the relationships and properties of the software objects, and
   11) outputting the results of the automatic analysis in printed or in electronic form.

2. The method according to claim 1, wherein the steps 7 to 8 are repeated periodically.

3. The method according to claim 1, wherein threshold values for parameters are defined, which threshold values serve to initiate an action.

4. The method according to claim 1, wherein the sensors used are a software product installed on a computer, a mobile device or a user input device.

5. The method according to claim 1, wherein the recorded data are business activities in an enterprise.

6. A computer readable storage medium containing a program for executing the steps according to claim 1.

7. A method for modeling, documenting and validating a production system, preferably a company, comprising the following steps:
   1) providing one or more sensors in the production system,
   2) defining data to be recorded by the sensors,
   3) parameterizing the data to be recorded,
   4) representing the parameterized data to by software objects with parameters,
   5) modeling products of the system by software objects that are product models, a product model comprising a representation of a product on at three different layers of abstraction, these layers of abstraction being
      a process layer;
      a support layer, representing entities that support the process layer, such entities being at least one of the group consisting of physical means, electrical components, mechanical components, organizational entities, standard software, infrastructure,
      an information/function layer associated with the support layer,
   6) modeling of one business value chain occurring in the system, a business value chain being a sequence of events and actions, by at least two business value chains in the model, the two business value chains being on different layers of abstraction and corresponding to said three layers of abstraction on which the model is represented,
   7) linking the parameters of the software objects by relationships,
   8) recording the parameterized data by means of the sensors,
   9) updating states of product models according to events occurring in the at least two business value chains on the different layers of abstraction,
   10) automatically analyzing the relationships and properties of the software objects, and
   11) outputting the results of the automatic analysis in printed or in electronic form.

* * * * *